US010029585B2

(12) United States Patent
Frye et al.

(10) Patent No.: US 10,029,585 B2
(45) Date of Patent: Jul. 24, 2018

(54) VEHICLE SEAT

(71) Applicant: FAURECIA AUTOMOTIVE SEATING, LLC, Troy, MI (US)

(72) Inventors: Dale J. Frye, West Olive, MI (US); Jeffery T. Bonk, Chesterfield, MI (US); Timothy L. Moulton, Newport, RI (US); Jared A. Judson, Medford, MA (US)

(73) Assignee: Faurecia Automotive Services, LLC, Auburn Hills, MI (US)

( * ) Notice: Subject to any disclaimer, the term of this patent is extended or adjusted under 35 U.S.C. 154(b) by 0 days.

(21) Appl. No.: 15/127,435

(22) PCT Filed: Mar. 26, 2015

(86) PCT No.: PCT/US2015/022679
§ 371 (c)(1),
(2) Date: Sep. 20, 2016

(87) PCT Pub. No.: WO2015/148774
PCT Pub. Date: Oct. 1, 2015

(65) Prior Publication Data
US 2017/0166089 A1 Jun. 15, 2017

Related U.S. Application Data

(60) Provisional application No. 61/970,681, filed on Mar. 26, 2014.

(51) Int. Cl.
B60N 2/02 (2006.01)
B60N 2/12 (2006.01)
(Continued)

(52) U.S. Cl.
CPC ......... B60N 2/0232 (2013.01); B60N 2/0228 (2013.01); B60N 2/0248 (2013.01);
(Continued)

(58) Field of Classification Search
CPC .. B60N 2/0228; B60N 2/0232; B60N 2/0248; B60N 2/0252; B60N 2/0296; B60N 2/08;
(Continued)

(56) References Cited

U.S. PATENT DOCUMENTS 4,689,537 A * 8/1987 Mizuta ................ B60N 2/0228
318/466
5,004,967 A * 4/1991 Ogasawara .......... B60N 2/0232
297/330
(Continued)

FOREIGN PATENT DOCUMENTS

DE 10353020 A1 6/2005
EP 1602797 A2 12/2005
(Continued)

OTHER PUBLICATIONS

PCT Search Report and Written Opinion completed by the ISA/EP dated Jun. 16, 2015 and issued in connection with PCT/US2015/022679.

(Continued)

Primary Examiner — Tyler J Lee
(74) Attorney, Agent, or Firm — Barnes & Thornburg LLP

(57) ABSTRACT

A vehicle seat includes a seat bottom adapted to slide along a floor, a seat back coupled to the seat bottom, and powered means for rearranging the vehicle seat by sliding the seat bottom along the floor and/or pivoting the seat back relative to the seat bottom.

26 Claims, 19 Drawing Sheets

(51) Int. Cl.
*B60N 2/16* (2006.01)
*B60N 2/08* (2006.01)
*B60N 2/42* (2006.01)

(52) U.S. Cl.
CPC ......... *B60N 2/0252* (2013.01); *B60N 2/0296* (2013.01); *B60N 2/08* (2013.01); *B60N 2/123* (2013.01); *B60N 2/16* (2013.01); *B60N 2/42* (2013.01)

(58) Field of Classification Search
CPC ............. B60N 2002/0236; B60N 2/42; B60N 2002/0256; B60N 2002/0268; B60N 2/002; B60N 2/0244; B60N 2/067
USPC .......................................................... 701/49
See application file for complete search history.

(56) References Cited

U.S. PATENT DOCUMENTS

| | | | |
|---|---|---|---|
| 6,113,051 A * | 9/2000 | Moradell | B60N 2/0705 248/430 |
| 6,157,372 A * | 12/2000 | Blackburn | G06F 3/04883 345/157 |
| 6,505,805 B2 * | 1/2003 | Fuller | B60N 2/123 248/429 |
| 7,156,442 B2 * | 1/2007 | McManus | B60N 2/06 296/65.09 |
| 7,667,345 B2 | 2/2010 | Budweg | |
| 8,042,868 B2 * | 10/2011 | Sakai | B60N 2/002 200/5 R |
| 2004/0187609 A1 * | 9/2004 | Nishio | G01G 19/4142 73/862.474 |
| 2007/0235297 A1 * | 10/2007 | Stoschek | B60N 2/0228 200/5 R |
| 2009/0062989 A1 * | 3/2009 | Sakai | B60N 2/002 701/45 |
| 2009/0088930 A1 * | 4/2009 | Ohtsubo | B60N 2/0252 701/49 |
| 2009/0292425 A1 * | 11/2009 | Nagata | B60N 2/0244 701/49 |
| 2010/0235006 A1 * | 9/2010 | Brown | B60L 11/182 700/286 |
| 2012/0032487 A1 * | 2/2012 | Yamaguchi | B60N 2/002 297/354.1 |
| 2013/0200668 A1 * | 8/2013 | Michalak | B60N 2/0232 297/217.1 |
| 2014/0265477 A1 * | 9/2014 | Yetukuri | B60N 2/0228 297/217.3 |
| 2014/0265479 A1 * | 9/2014 | Bennett | B60N 2/502 297/217.4 |
| 2016/0193976 A1 * | 7/2016 | Wild | B60N 2/0228 701/36 |
| 2017/0010797 A1 * | 1/2017 | Lee | G06F 3/017 |

FOREIGN PATENT DOCUMENTS

| | | |
|---|---|---|
| EP | 1849647 A2 | 10/2007 |
| FR | 2982542 A1 | 5/2013 |
| JP | 2010076493 | 4/2010 |
| WO | 2006134417 A1 | 12/2006 |
| WO | 20120082052 A1 | 6/2012 |
| WO | 2012161094 A1 | 11/2012 |

OTHER PUBLICATIONS

International (PCT) Preliminary Report on Patentability for International App. No. PCT/US2015/022679, 3612 1.WO II, 11 pages.
Chinese Office Action for Chinese App. No. 201580014500.3 dated Feb. 27, 2018, 20 pages.

* cited by examiner

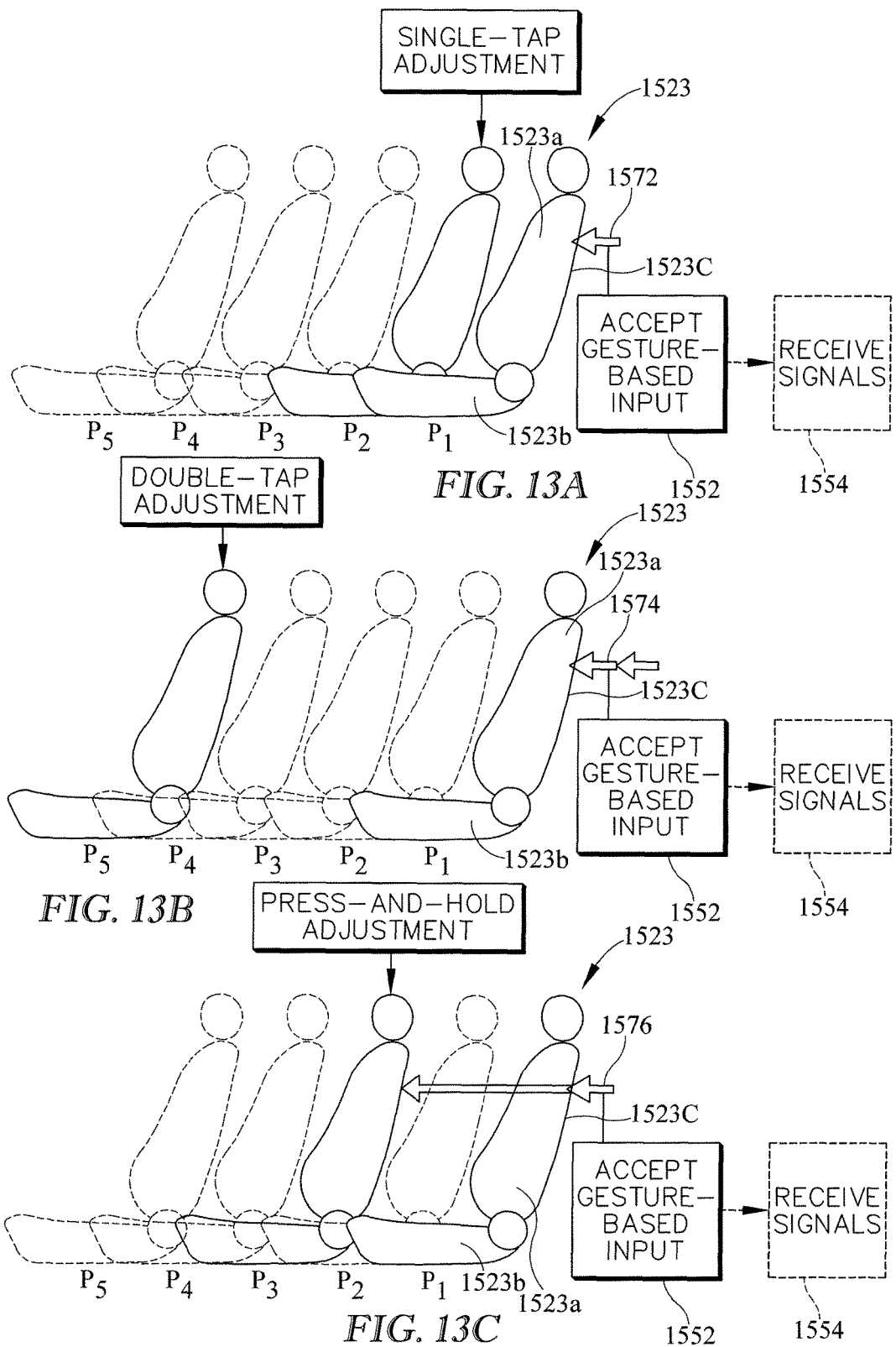

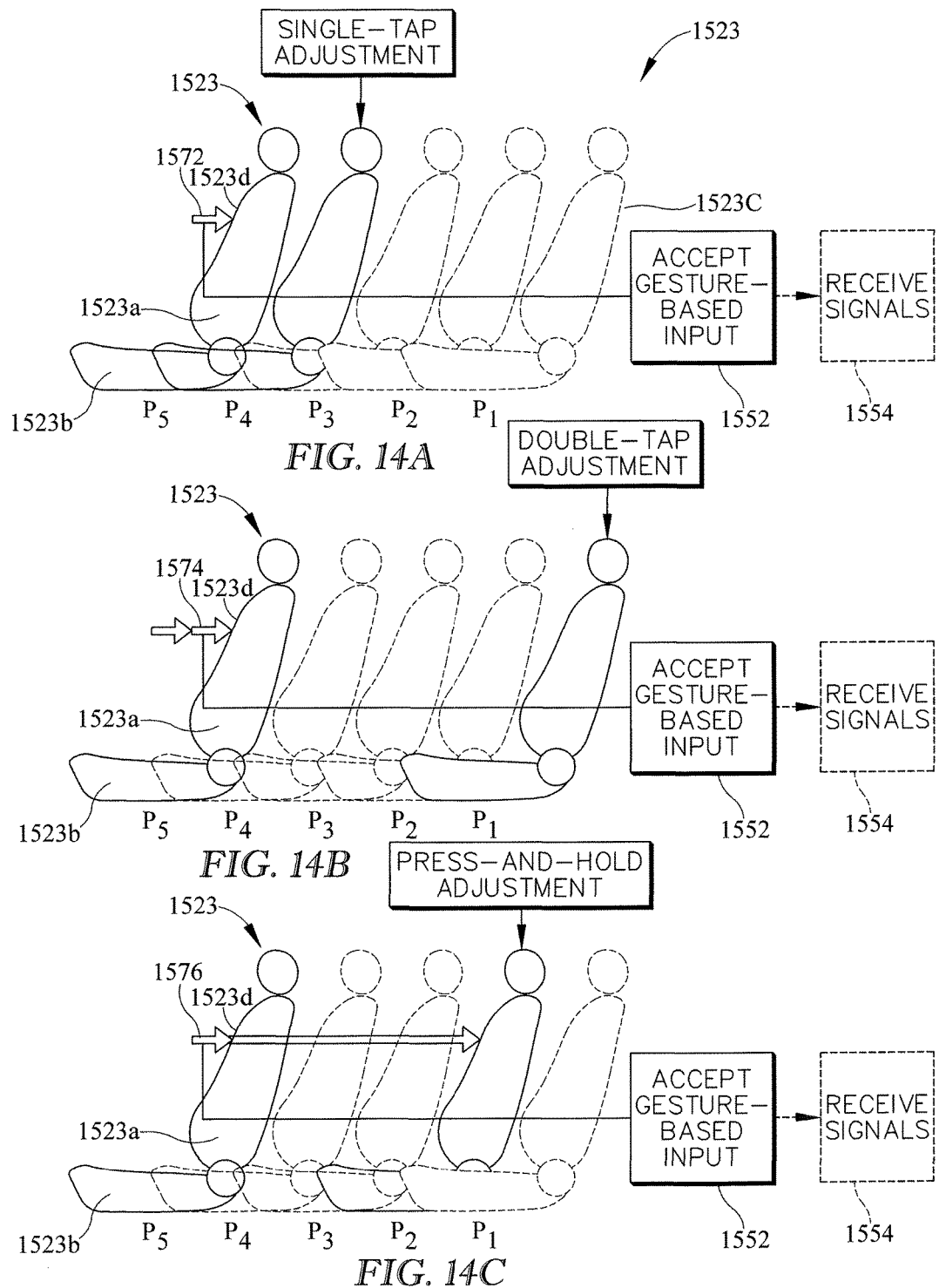

VEHICLE SEAT

CROSS REFERENCE TO RELATED APPLICATIONS

This application is a U.S. national stage application of international application No. PCT/US2015/022679 filed Mar. 26, 2015, which claims priority to U.S. Provisional Application Ser. No. 61/970,681, filed March, 2014, The entire disclosures of PCT/US2015/022679 and U.S. Ser. No. 61/970,681 are hereby incorporated by reference.

BACKGROUND

The present disclosure relates to a vehicle seat, and in particular to a vehicle seat movable within a passenger vehicle. More particularly, the present disclosure relates to a powered vehicle seat.

SUMMARY

According to the present disclosure, a vehicle seat is mounted to a floor in a passenger vehicle and is adapted to move within the passenger vehicle to a variety of positions. The vehicle seat illustratively includes a seat bottom mounted to a track to slide along the track relative to the floor, a seat back mounted to the seat bottom to pivot relative to the seat bottom, and a seat motion system coupled to the seat bottom and the seat back. The seat motion system provides powered means for rearranging the vehicle seat within the passenger vehicle by sliding the seat bottom along the floor and/or pivoting the seat back relative to the seat bottom.

In illustrative embodiments, the seat motion system includes a slide mover that moves the seat bottom along the floor and a controller coupled to the slide mover. The slide mover may take a number of different forms. The controller directs operation of the motor based on force signals received from sensors that detect if a user is pushing or pulling on the seat back or seat bottom so that the vehicle seat glides along the floor when gently pushed or pulled by a user without requiring the user to manually overcome all frictional and gravitational forces resisting movement of the vehicle seat.

In illustrative embodiments, the controller is configured to process signals received from the sensors in order to effectively operate the slide mover. In some examples, the controller may multiply the force signals by different coefficients depending on whether the vehicle seat is pushed forward or pulled backward. In some examples, the controller may multiply the force signals by different coefficients depending on whether the force signals are associated with a force applied to the seat bottom or the seat back. In some examples, the controller may multiply the force signals by different coefficients depending on the location of the vehicle seat relative to the track.

In illustrative embodiments, the sensors of the seat motion system accepts gesture-based inputs from a user seeking to adjust the vehicle seats in a predetermined manner and provide a gesture-adjustment system. Different gestures applied by the user to the vehicle seats result in different respective vehicle seat adjustments. The gesture-adjustment system determines the desired vehicle seat adjustments by analyzing the gesture-based input from the user and generates vehicle adjustment signals reflecting the desired vehicle seat adjustments. The gesture-adjustment system transmits the vehicle adjustment signal to an actuation unit, which causes the vehicle seats to adjust in accordance with the desired vehicle seat adjustments.

In illustrative embodiments, the gesture-adjustment system accepts gesture-based inputs on front, rear, or side surfaces of vehicle seat backs or vehicle seat bottoms. Gesture-based inputs include tapping gestures (e.g., single-tap, double-tap, etc.), press-and-hold gestures, swiping gestures (e.g., single-swipe, double-swipe, hooked-swipe, etc.), and others. In response to receiving the gesture-based inputs, the gesture-adjustment system implements vehicle seat adjustments that correspond to the respective gestures, include moving seat bottoms forward or backward longitudinally by predetermined distances and/or pivoting seat backs relative to seat bottoms by predetermined angular amounts. In illustrative embodiments, a single-tap applied to a rear surface of a vehicle seat moves the seat bottom of the vehicle seat forward longitudinally by a fixed distance, a double-tap applied to a rear surface of a vehicle seat moves the seat bottom of the vehicle seat longitudinally to a full-forward position, a single-tap applied to a front surface of a vehicle seat moves the seat bottom backward longitudinally by a fixed distance, and a double-tap applied to a front surface of a vehicle seat moves the seat bottom of the vehicle seat longitudinally to a full-back position.

In illustrative embodiments, the gesture-adjustment system operates in different modes depending on the current status of the vehicle, including a transit-mode for when the vehicle is moving, a passenger-entry mode for when passengers are entering the vehicle, and a cargo-loading mode for when a user is loading cargo into the vehicle. This enables the gesture-adjustment system to select vehicle seat adjustments that are most appropriate for the current status of the vehicle. For example, in a cargo-loading mode, the gesture-adjustment system is configured to accept and respond to gesture-based inputs from cargo itself (e.g., from pressure applied by cargo on vehicle seat surfaces), in addition to gesture-based inputs from users.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a side perspective view of a passenger vehicle showing a driver seated in a vehicle seat mounted to a floor for powered movement along the floor and diagrammatically showing that the vehicle seat includes a seat motion system adapted to provide means for rearranging the vehicle seat within the passenger vehicle by sliding a seat bottom of the vehicle seat along the floor and/or pivoting a seat back of the vehicle seat relative to the seat bottom when the seat bottom or seat back are gently pushed or pulled by a user without requiring the user to manually overcome all frictional and gravitational forces resisting movement of the vehicle seat;

FIG. 2 is diagrammatic view of the second-row vehicle seat of FIG. 1 showing that the seat bottom is coupled to a track mounted to the floor to slide on the track relative to the floor and showing that the seat motion system includes a slide mover configured to move the seat bottom along the track, a sensor unit configured to detect forces applied to front and back sides of the seat back, and a controller coupled to each of the other components of the seat motion system;

Figure 1:
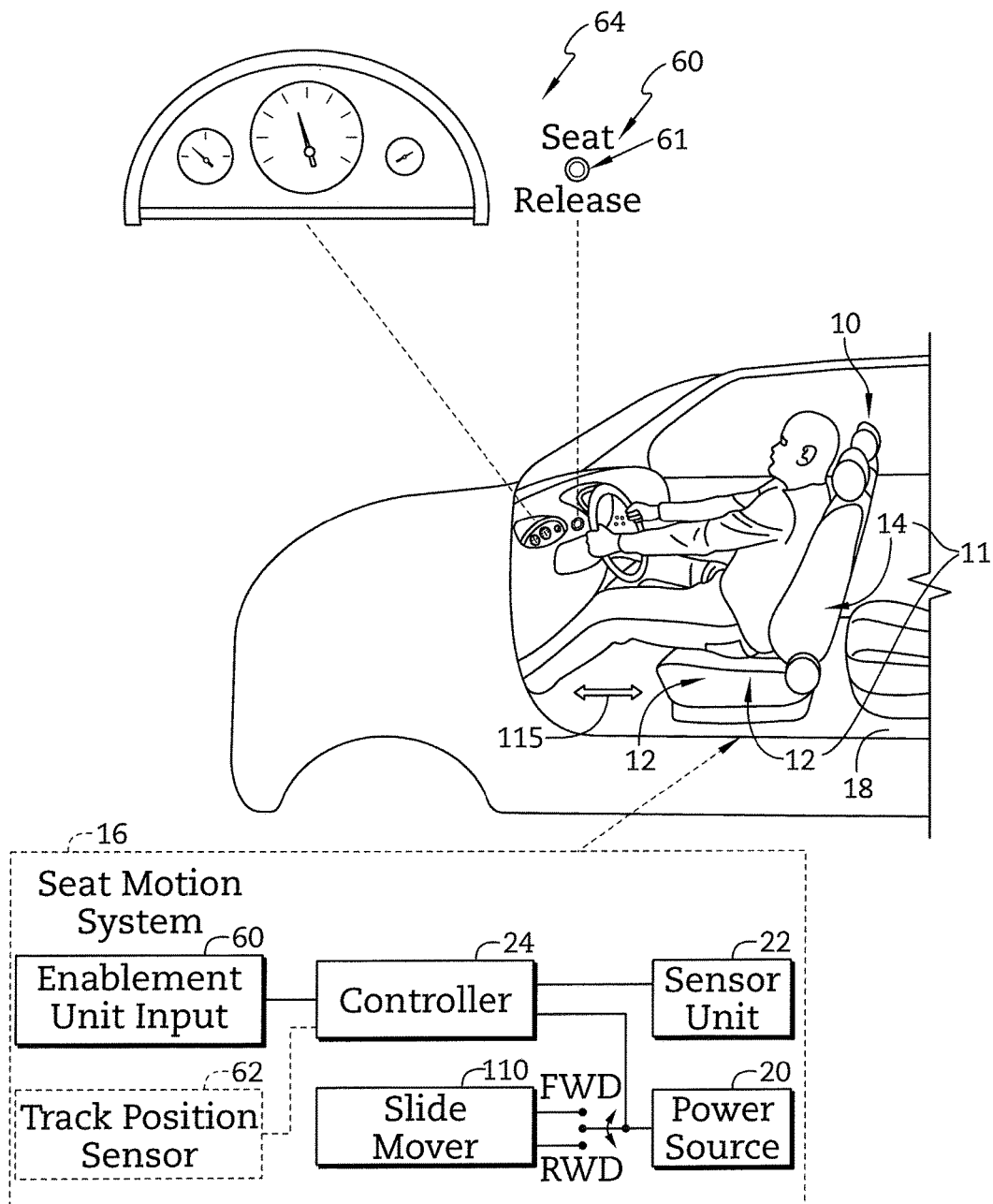
Figure 10:
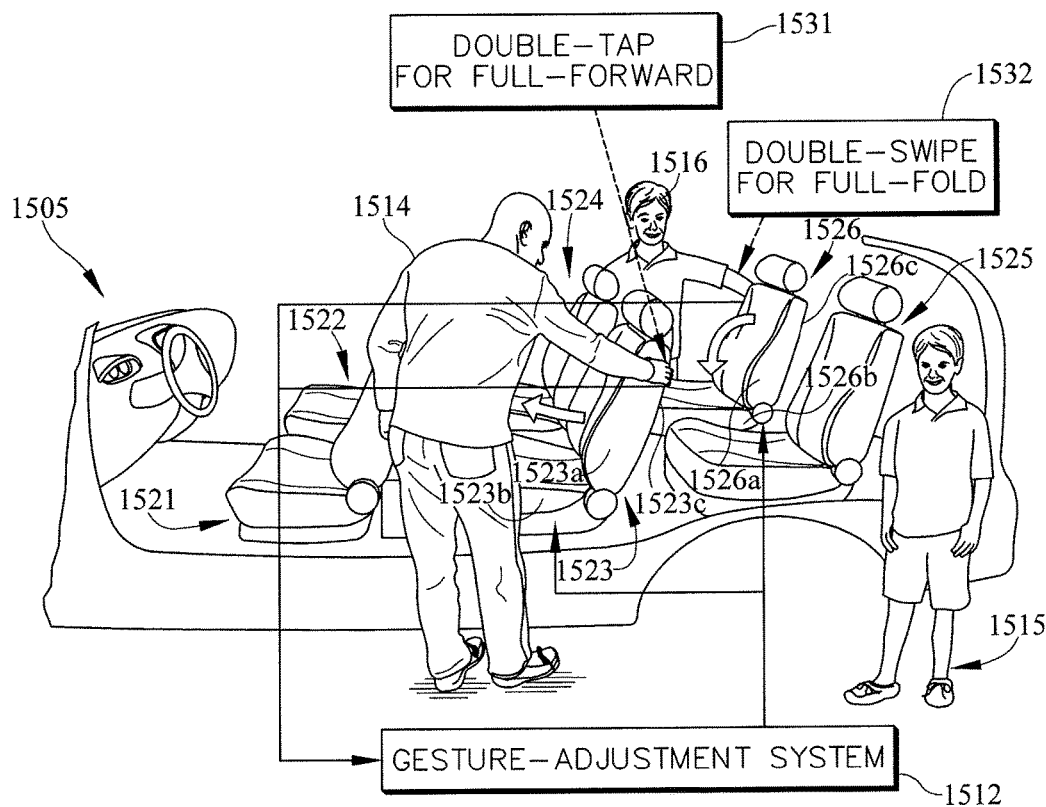
FIGS. 10 and 11 are a series of side perspective views showing exemplary scenarios in which users invoke a gesture-adjustment process performed by a gesture-adjustment system to move vehicle seats in order to better accommodate passengers trying to enter the vehicle and in order to better accommodate cargo being loaded into the vehicle.
Figure 11:
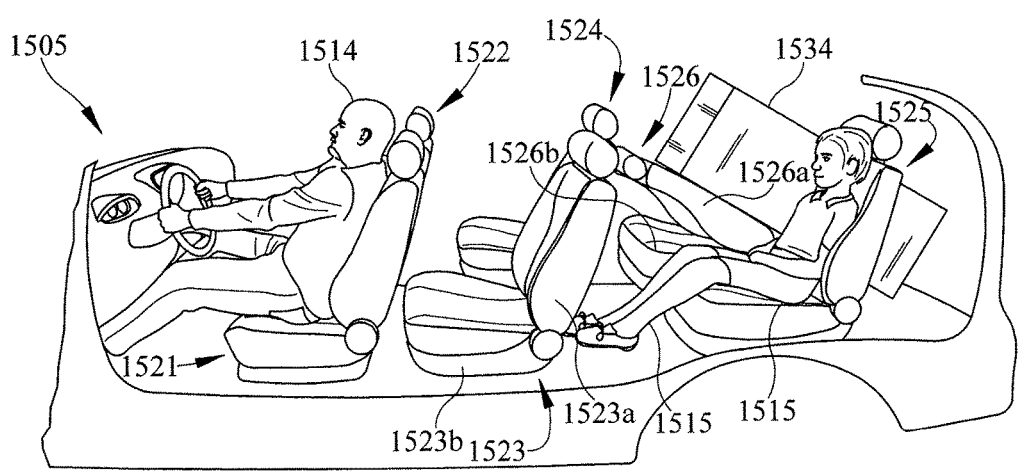
Figure 12:
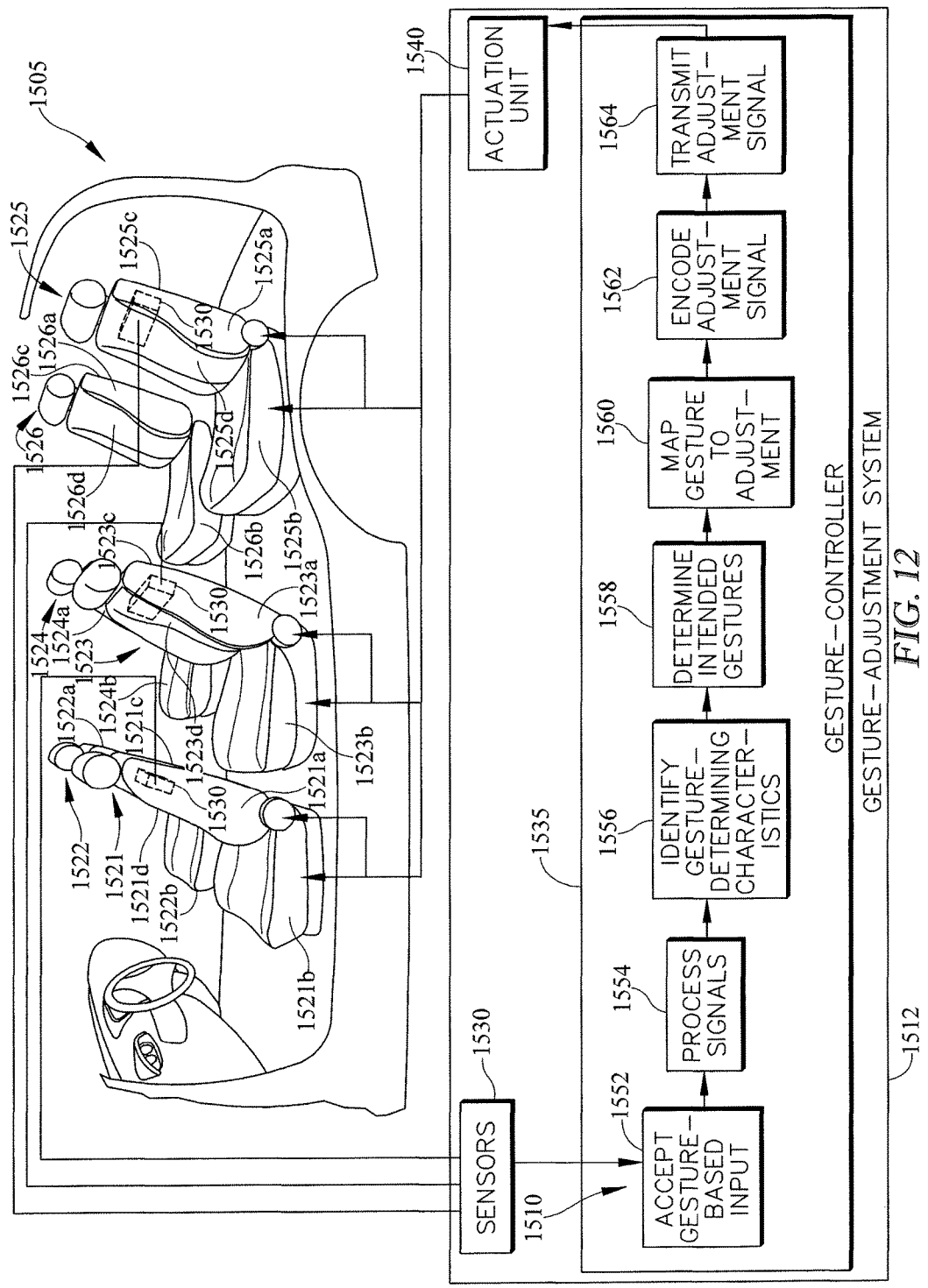
Figures 15A, 15B:
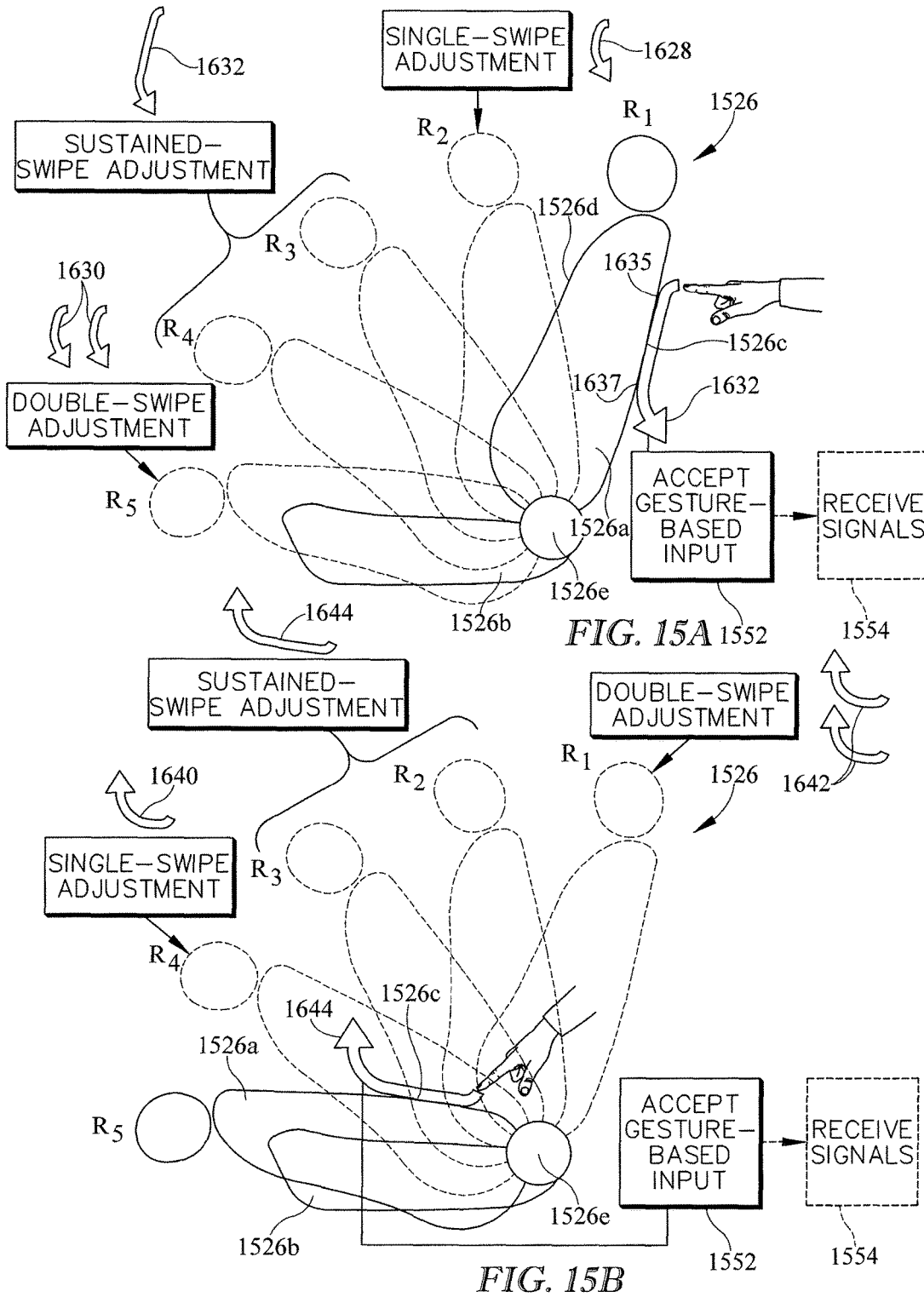
Figure 16:
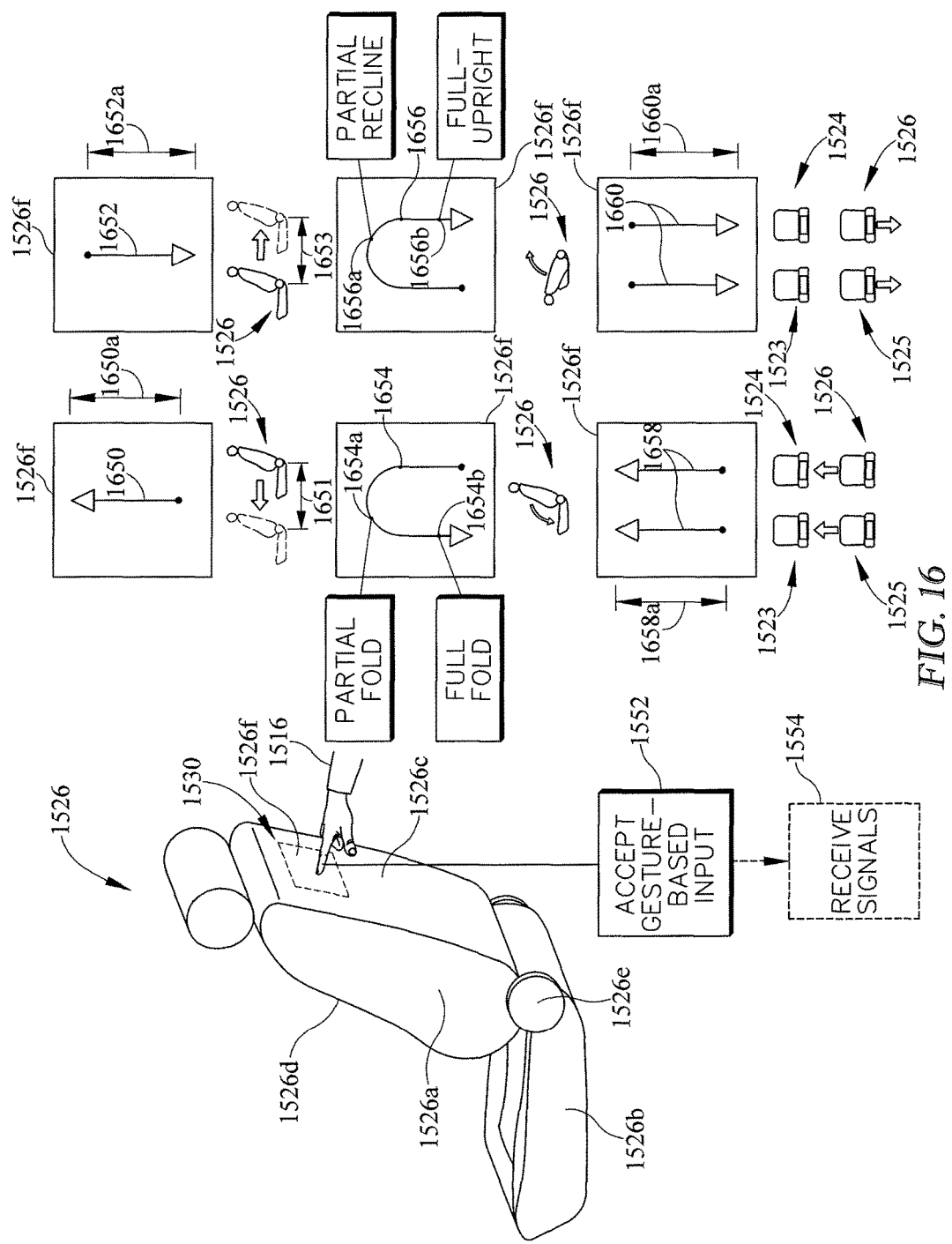
Figure 17:
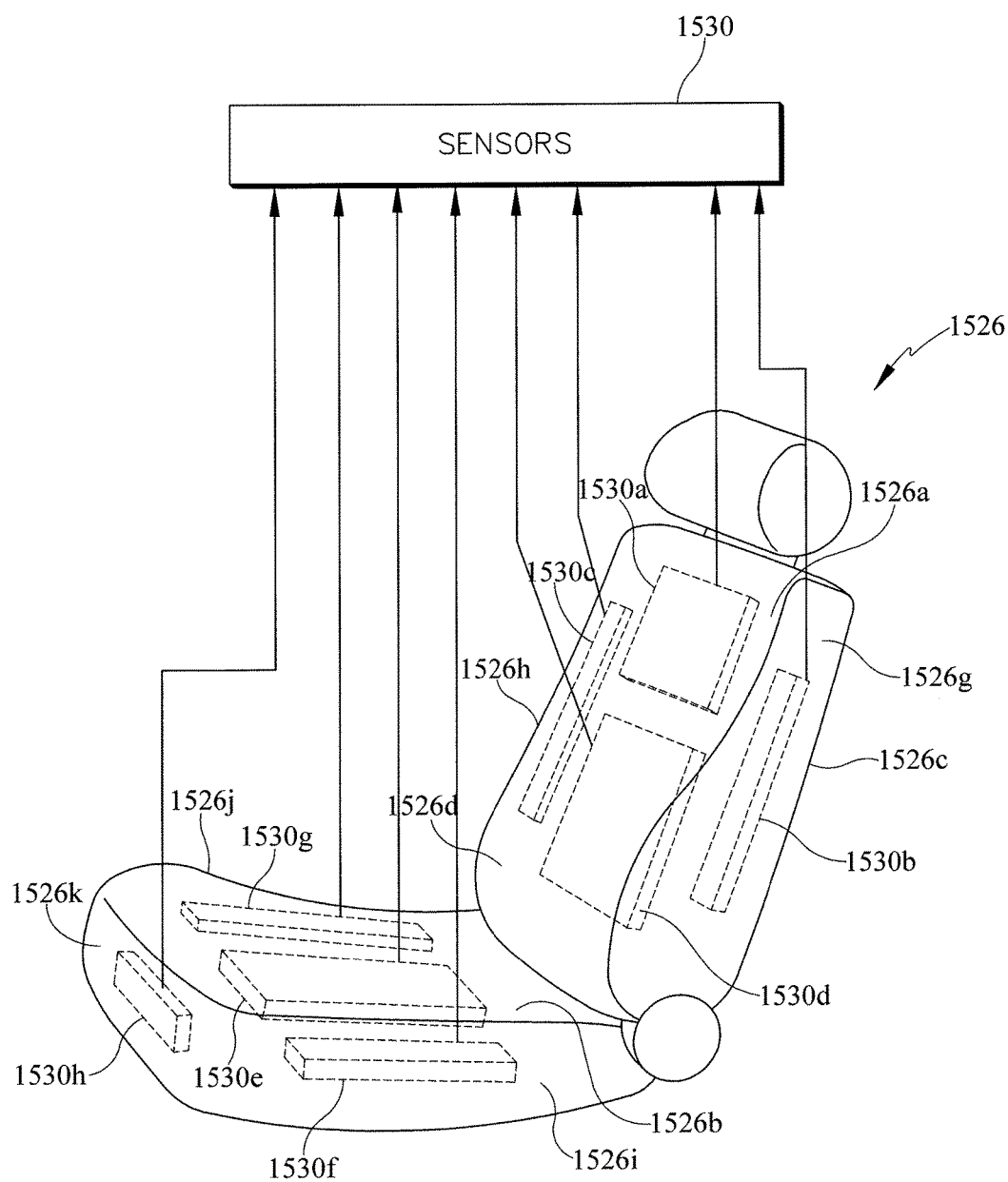
Figure 18:
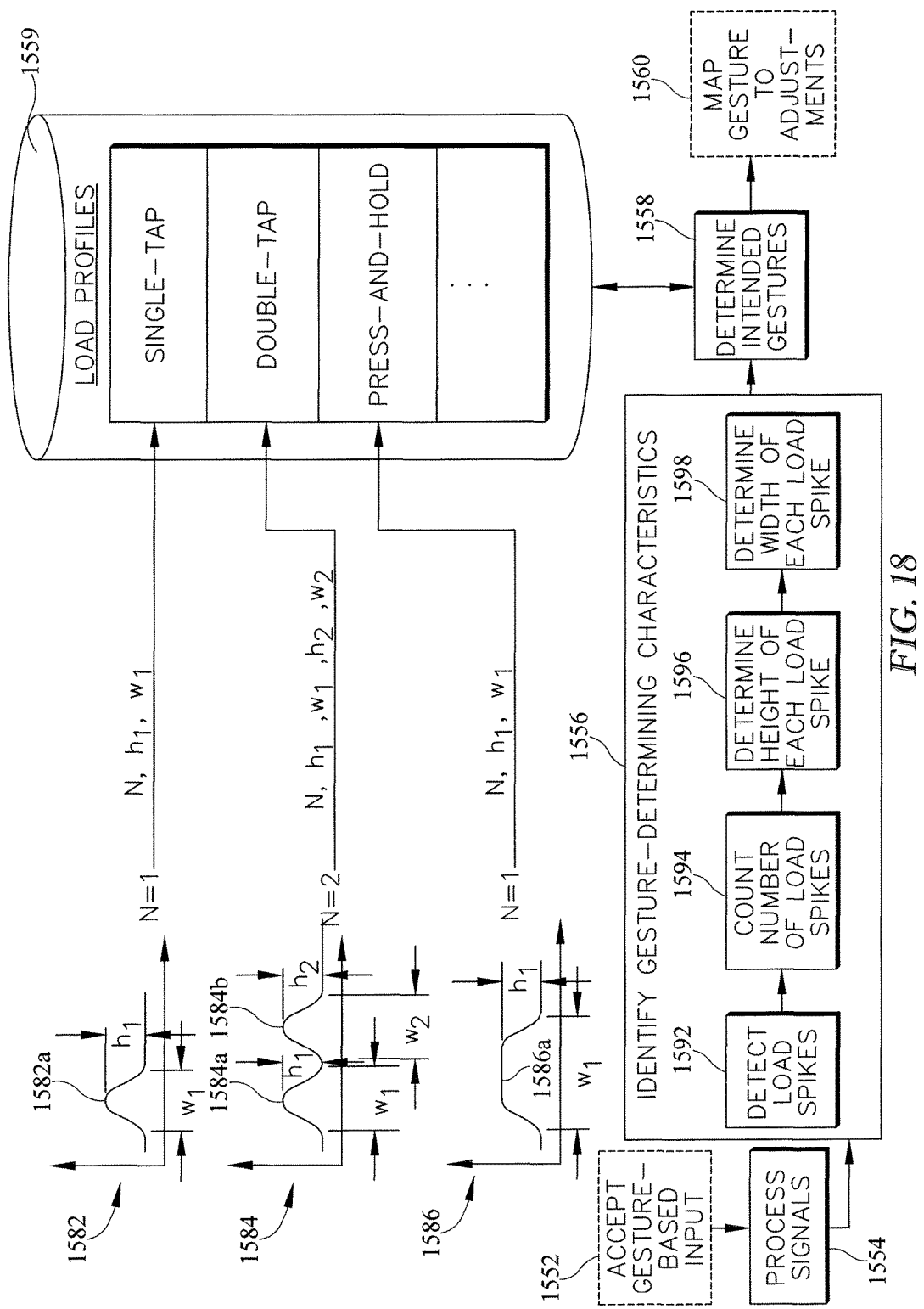
Figure 19:
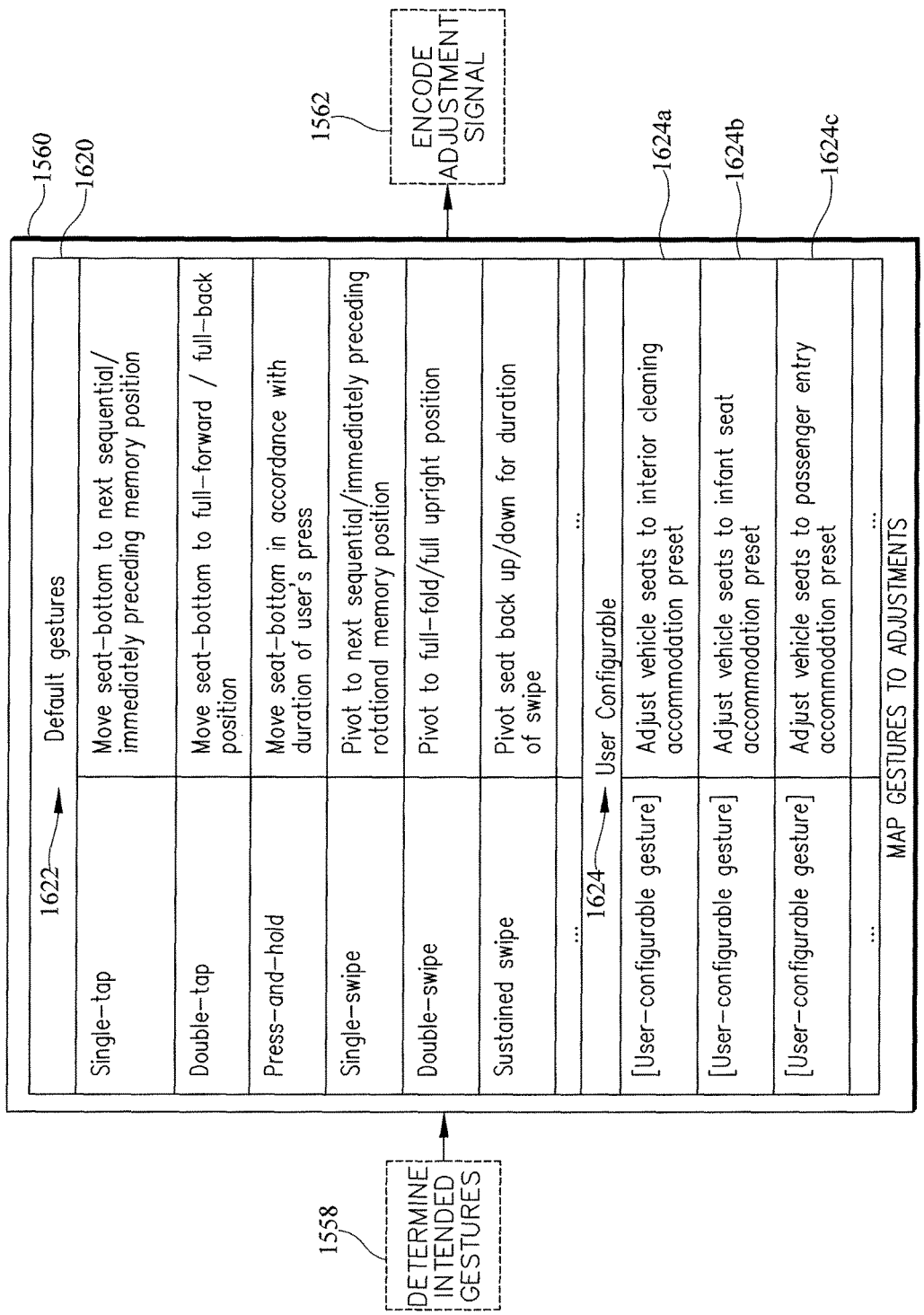
Figure 20:
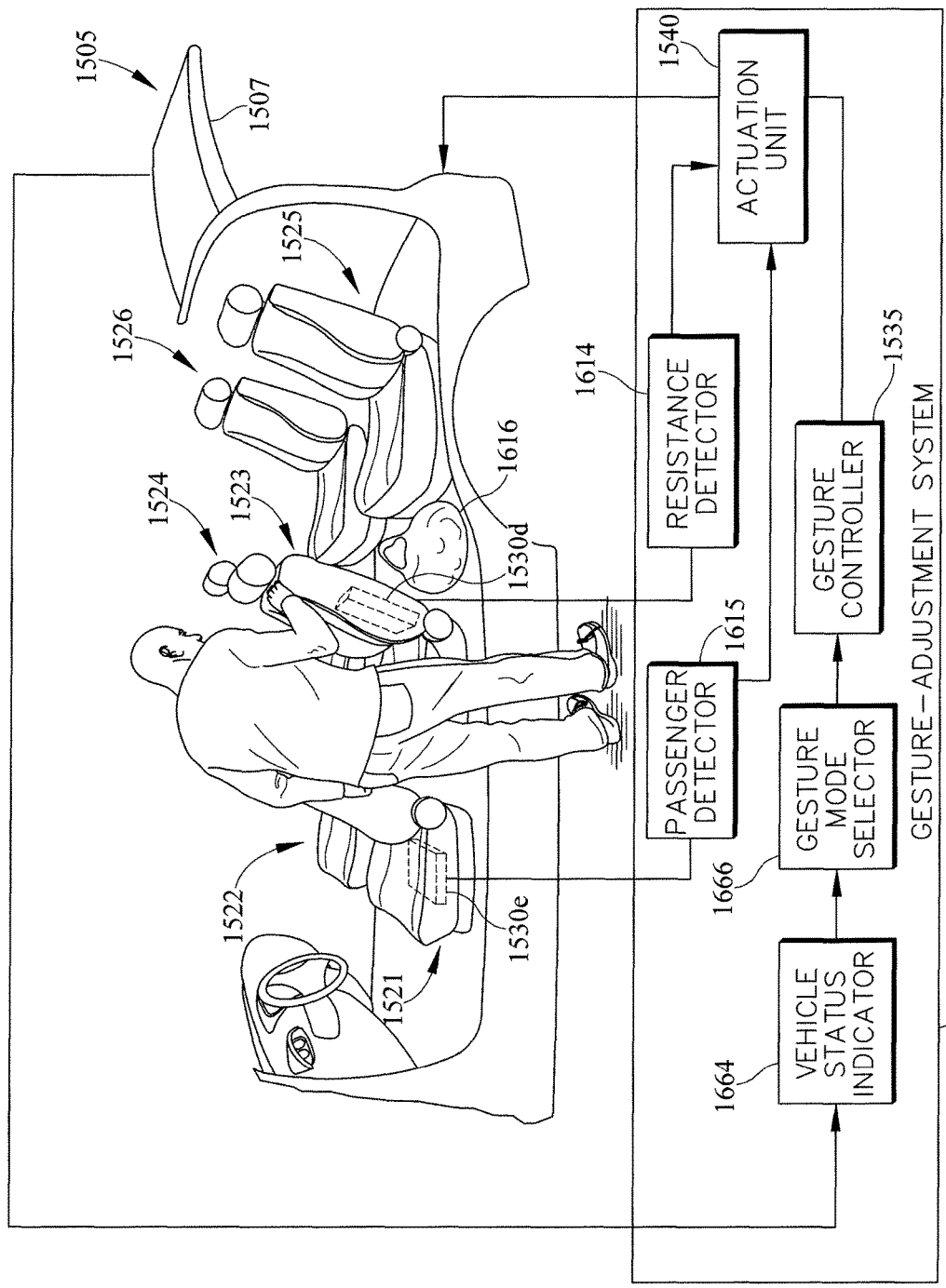
Figure 21:
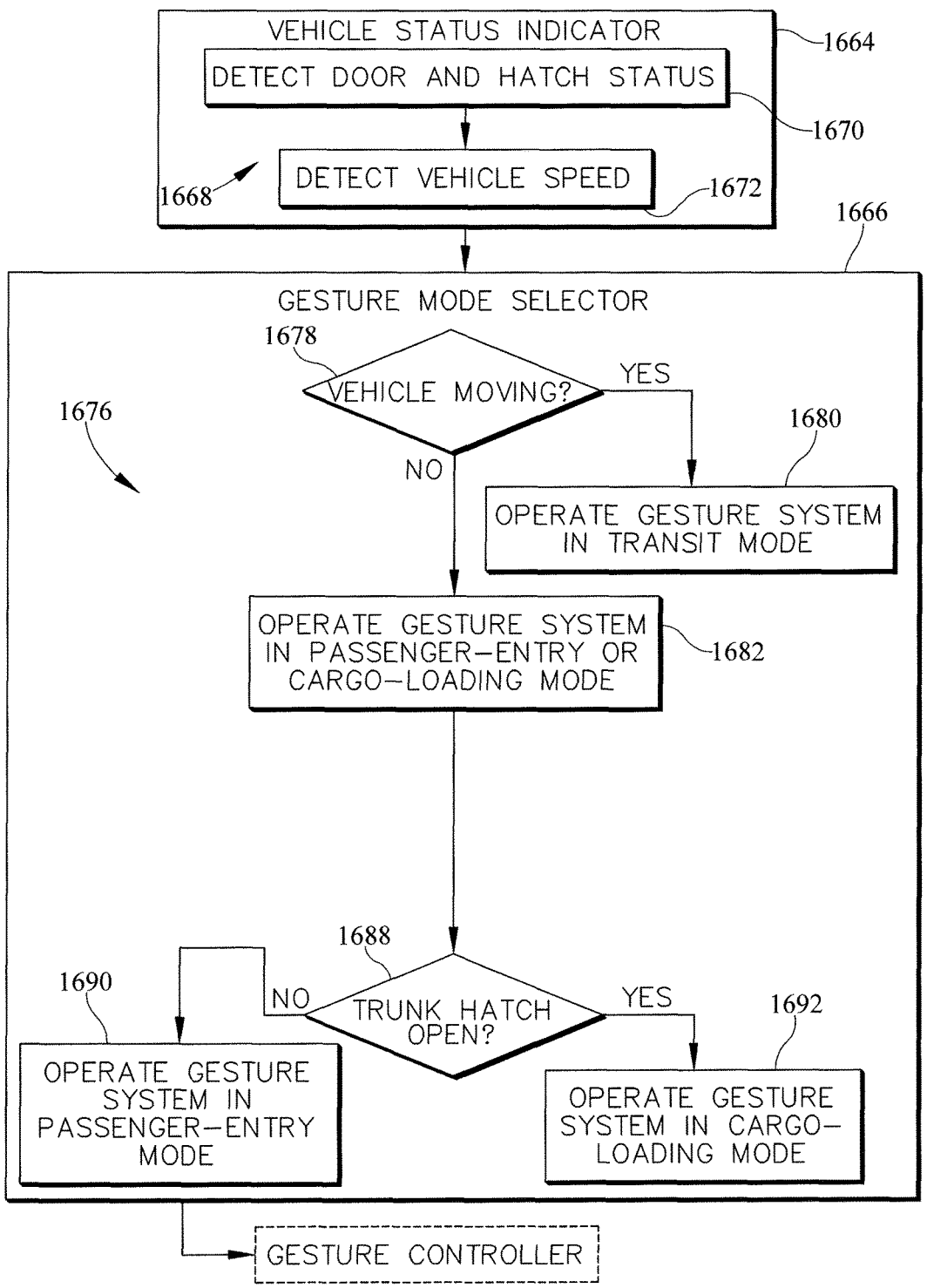
Figures 22A, 22B, 22C:
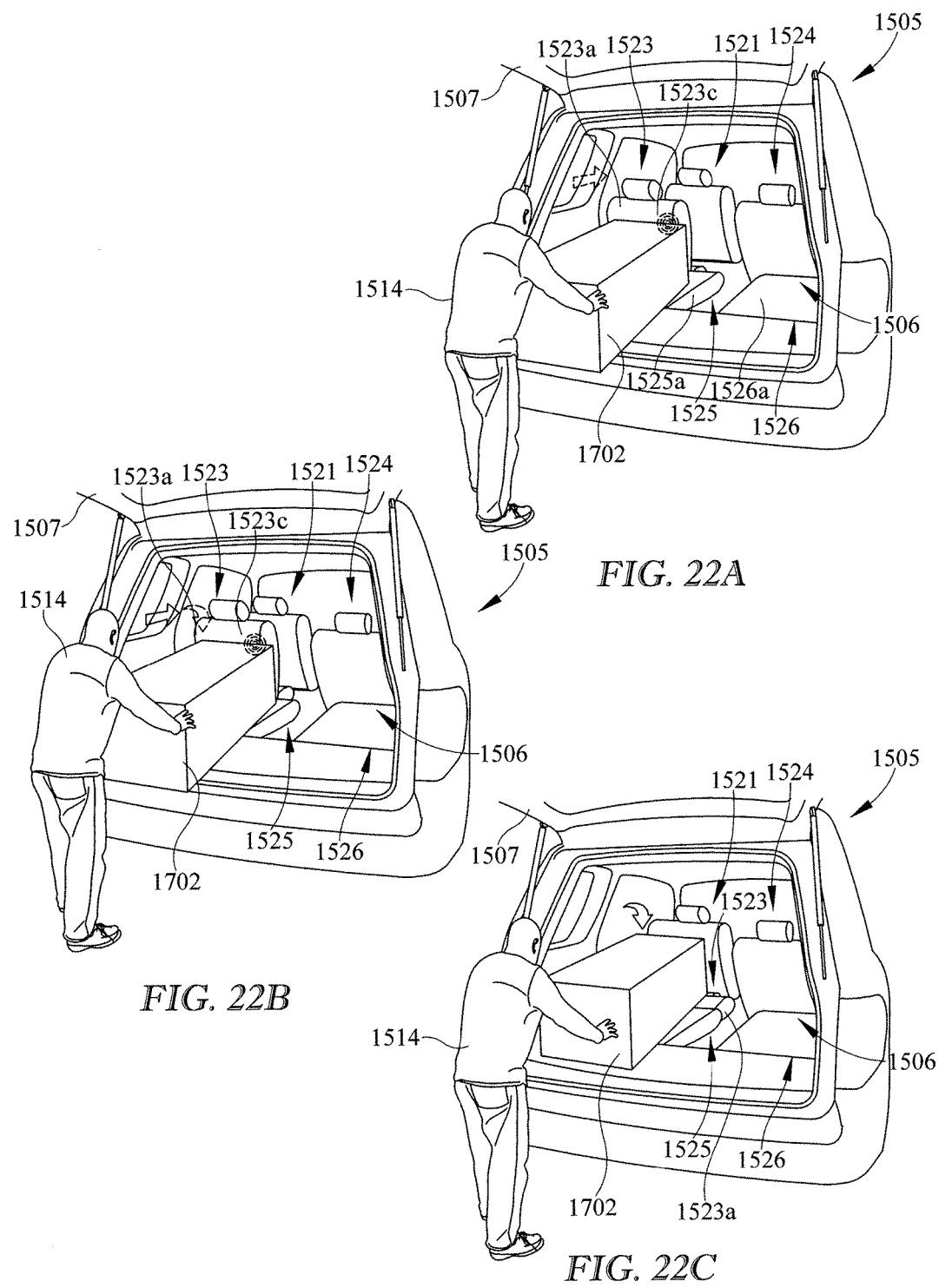

FIG. 10 is a partial side perspective view of a vehicle suggesting that a first user applies a double-tap gesture to a rear surface of a seat back of a second-row vehicle seat to move the second-row vehicle seat forward longitudinally to accommodate entry and occupancy of a passenger in a third-row vehicle seat and further suggesting that a second user applies a double-swipe gesture to a rear surface of a seat back of a third-row vehicle seat to pivot the seat back of the third-row vehicle seat downwards to accommodate cargo that will be partially stowed on top of the seat back of the third-row vehicle seat;

FIG. 11 is a view similar to FIG. 12 showing that the second-row vehicle seat has moved forward longitudinally to accommodate entry and occupancy of a passenger in a third-row vehicle seat in response to the double-tap gesture of FIG. 1A and further showing that the seat back of a third-row vehicle seat has pivoted downwards in response to the double-swipe gesture of FIG. 10 to accommodate cargo being stowed on top of the seat back of the third-row vehicle seat;

FIG. 12 is a diagrammatic view of a gesture-adjustment process in accordance with the present disclosure showing that the gesture-adjustment process is performed by a gesture-adjustment system including sensors, a gesture controller, and an actuation unit, and suggesting that the gesture-adjustment process includes the steps of accepting gesture-based inputs, processing signals from sensors, identifying gesture-determining characteristics based on the processed signals, determining intended gestures based on the gesture-determining characteristics, mapping the intended gestures to vehicle seat adjustments to be implemented by the gesture-adjustment system, encoding a vehicle adjustment signal reflecting the adjustments to be implemented, and transmitting the vehicle adjustment signal to the actuation unit for actuation of vehicle seats in accordance with the adjustments;

FIGS. 13A-13C are a series of elevation views of a vehicle seat suggesting that the vehicle seat may occupy different respective longitudinal memory positions depending on gesture-based inputs and suggesting that different types of forward-motion gestures applied to a rear surface of a seat back of the vehicle seat result in different respective types of seat adjustments;

FIG. 13A is a side perspective view of a vehicle seat that may occupy different respective longitudinal memory positions depending on gesture-based inputs and suggests that a single-tap gesture applied to a rear surface of the seat back results in the vehicle seat moving forward longitudinally to a next sequential memory position;

FIG. 13B is a side perspective view of the vehicle seat of FIG. 3A and suggests that a double-tap gesture applied to a rear surface of the seat back results in the vehicle seat moving forward longitudinally to a full-forward position;

FIG. 13C is a side perspective view of the vehicle seat of FIGS. 13A and 13B and suggests that the vehicle seat moves forward longitudinally in response to a press-and-hold gesture applied to a rear surface of the seat back for the duration of time that the user presses against the rear surface of the seat back and stops moving forward longitudinally in response to the user releasing the rear surface of the seat back;

FIGS. 14A-14C are a series of views similar to FIGS. 13A-13C suggesting that different types of backward-motion gestures applied to a front surface of the seat back of the vehicle seat result in different respective types of seat adjustments;

FIG. 14A is a side perspective view of a vehicle seat that may occupy different respective longitudinal memory positions depending on gesture-based inputs and suggests that a single-tap gesture applied to the front surface of the seat back results in the vehicle seat moving backward longitudinally to an immediately preceding memory position;

FIG. 14B is a side perspective view of the vehicle seat of FIG. 14A and suggests that a double-tap gesture applied to the front surface of the seat back results in the vehicle seat moving to a full-back position;

FIG. 14C is a side perspective view of the vehicle seat of FIGS. 14A and 14B and suggests that the vehicle seat moves backward longitudinally in response to a press-and-hold gesture applied to the front surface of the seat back for the duration of time that the user presses against the front surface of the seat back and stops moving longitudinally backward in response to the user releasing the front surface of the seat back;

FIGS. 15A-15B are a series of side perspective views of a vehicle seat showing that a seat back of the vehicle seat may occupy different respective rotational memory positions depending on gesture-based inputs and suggesting that different types of swiping gestures applied to a rear surface of the seat back result in different respective types of seat back pivoting adjustments;

FIG. 15A is a side perspective view of a vehicle seat having a seat back that may occupy different respective rotational memory positions depending on gesture-based inputs and suggests that a single-swipe downward gesture applied to a rear surface of the seat back results in the seat back pivoting down to a next sequential rotational memory position, a double-swipe downward gesture applied to a rear surface of the seat back results in the seat back pivoting down to a full-fold position, and a sustained-swipe downward gesture applied to a rear surface of the seat back results in the seat back pivoting down for the duration of time that the user drags a finger down the rear surface of the seat back;

FIG. 15B is a side perspective view of the vehicle seat of FIG. 15A suggesting that a single-swipe upward gesture applied to a rear surface of the seat back results in the seat back pivoting up to an immediately preceding rotational memory position, a double-swipe upward gesture applied to a rear surface of the seat back results in the seat back pivoting up to a full-upright position, and a sustained-swipe upward gesture applied to a rear surface of the seat back results in the seat back pivoting up for the duration of time that the user drags a finger up the rear surface of the seat back;

FIG. 16 is a perspective and diagrammatic view of a vehicle seat showing that the vehicle seat has a touch-sensitive surface for receiving gesture-based inputs drawn by a user and suggests that the user can draw various gesture-based inputs to cause the gesture-based adjustment system of FIG. 1 to invoke respective types of vehicle seat adjustments, including an upward and downward drag gestures that causes the gesture-adjustment system to move the vehicle seat longitudinally, hook gestures that cause the gesture-adjustment system to pivot a seat back of the vehicle seat, and multi-touch gestures that cause the gesture-adjustment system to move pairs of vehicle seats at the same time;

FIG. 17 is a perspective view of a vehicle seat showing illustrative locations of the sensors of FIG. 12 including a sensor located near a front surface of a seat bottom of the vehicle seat, a sensor centrally located within the seat bottom, sensors located on left and right sides of the seat bottom, a sensor located in an upper portion of a seat back of the vehicle seat, a sensor located in a lower portion of the seat back of the vehicle seat, and sensors located on left and right sides of the seat back of the vehicle seat;

FIG. 18 is a diagrammatic view of the processing signals step, the identifying gesture-determining characteristics step, and the determining intended gestures step of the gesture-adjustment process of FIG. 12 showing that the processed signals are reflective of the amount of pressure a user applies to a surface of a vehicle seat, the identifying gesture-determining characteristics step includes detecting, counting, and measuring heights and widths of load spikes in a received signal, and the determining intended gestures step includes querying a database to find load profiles representative of the gesture-determining characteristics to retrieve an intended gesture;

FIG. 19 is a diagrammatic view of the mapping gestures to adjustments step of the gesture-adjustment process of FIG. 12 showing that the gesture-controller maps default, pre-programmed gestures to respective vehicle seat adjustments and maps other user-configurable gestures to respective preset vehicle seat adjustments;

FIG. 20 is a diagrammatic view of a second embodiment of a gesture-adjustment system in accordance with the present disclosure similar to that shown in FIG. 12, but also including a vehicle status indicator, a gesture-mode selector that selects a gesture-mode responsive to outputs of the vehicle status indicator, a passenger detector for detecting whether passengers are occupying any of the vehicle seats, and a resistance detector that detects cargo or passengers that are obstructing the motion of the vehicle seat;

FIG. 21 is a diagrammatic view of a vehicle status detection process and a gesture mode selection process in accordance with the present disclosure showing that the vehicle status detection process includes the steps of detecting the status of vehicle doors and detecting vehicle speed and showing that the gesture mode selection process includes steps for determining whether the gesture-adjustment system should operate in transit-mode, cargo-loading mode, or passenger-entry mode;

FIG. 22A is a rear perspective view of a vehicle suggesting that the gesture-adjustment system is operating in a cargo-loading mode and is configured to slide a second-row vehicle seat forward longitudinally in response to application by cargo of a forward-motion gesture onto a rear surface of a seat back of the second-row vehicle seat during loading of the cargo;

FIG. 22B is a view similar to FIG. 22A showing the second-row vehicle seat moved forward longitudinally toward the first-row vehicle seats after the cargo has applied a forward-motion gesture onto the rear surface of the seat back of the second-row vehicle seat and suggesting that the gesture-adjustment system pivots the seat back of the second-row vehicle seat down in response to a further forward-motion gesture applied by the cargo onto a rear surface of the seat back; and FIG. 22C is a view similar to FIGS. 22A and 22B showing the seat back of the second-row vehicle seat pivots down toward the seat bottom to allow the cargo to be further inserted into the vehicle trunk and partially stowed on top of the second-row vehicle seat.

DETAILED DESCRIPTION

A vehicle seat 10 adapted for use passenger vehicles is mounted to a floor 18 as shown in FIG. 1. The vehicle seat 10 includes a powered slide mover 110 adapted to move a passenger support portion 11 of the vehicle seat 10 along the floor 18 in response to a user gently pushing or pulling on the passenger support portion 11 of the vehicle seat 10. Accordingly, the passenger support 11 of the vehicle seat 10 glides along the floor 18 without requiring the user to manipulate input buttons, switches, and levers associated with movement along the floor 18 and without having to manually overcome forces resisting movement of the vehicle seat 10 as suggested in FIG. 1.

The vehicle seat 10 illustratively includes a seat bottom 12, a seat back 14, and a seat motion system 16 as shown, for example, in FIG. 1. The seat bottom 12 and seat back 14 cooperate to provide the passenger support 11 that is coupled to a track 15 mounted on the floor 18 so that the passenger support 11 can slide along the floor 18. The seat back 14 extends upwardly from the seat bottom 12. The seat motion system 16 is coupled to the seat bottom 12 and the seat back 14 to provide powered means for sliding the seat bottom 12 along the floor 18 in response to a user input applied to the seat bottom 12 or the seat back 14 of the vehicle seat 10 as suggested in FIG. 1.

Figure 2:
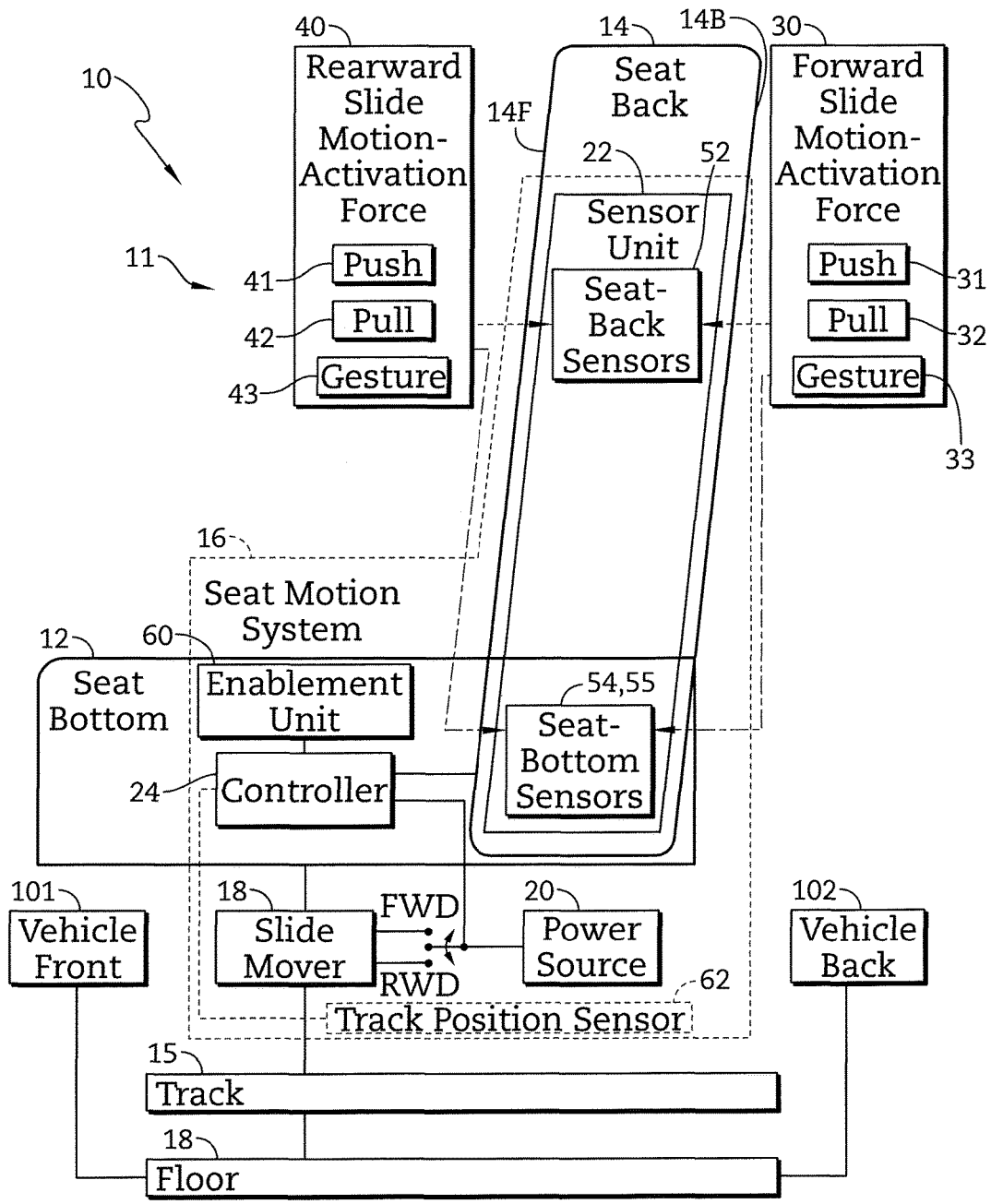

The seat motion system 16 includes a slide mover 110, a power source 20, a sensor unit 22, and a controller 24 coupled to each of the other components of the seat motion system 16 as shown in FIGS. 1 and 2. The slide mover 110 is configured to move the passenger support 11 along the floor 18. The power source 20 is selectively coupled to the slide mover 110 by the controller 24 to slide the seat bottom forward or backward along the track 15. The sensor unit 22 detects forces applied to the seat bottom 12 and to front or back sides 14F, 14B of the seat back 14. The controller 24 receives the signals from the sensor unit 22 and is configured to activate the slide mover 110 in response as suggested in FIG. 21. Thus, the seat motion system 16 provides means for rearranging the vehicle seat 10 by moving the passenger support 11 in response to a user applying a force onto the passenger support 11 so that the vehicle seat 10 glides along the floor 18 when gently pushed or pulled by a user without requiring the user to manually overcome all frictional and gravitational forces resisting movement of the vehicle seat 10.

In the illustrative embodiment, the seat motion system 16 also includes an enablement unit 60 and, optionally, may include a track position sensor 62 as shown in FIGS. 1 and 2. The enablement unit 60 is illustratively embodied as an enablement button 61 incorporated into a dash display 64 that may be pressed to indicate to the controller 24 that additional force applied to the vehicle seat 10 is intended to cause movement of the passenger support 11 along the floor 18. The optional track position sensor 62 may be used in some embodiments as an input for adjusting the speed at which the passenger support 11 is moved along the floor 18.

Figure 3:
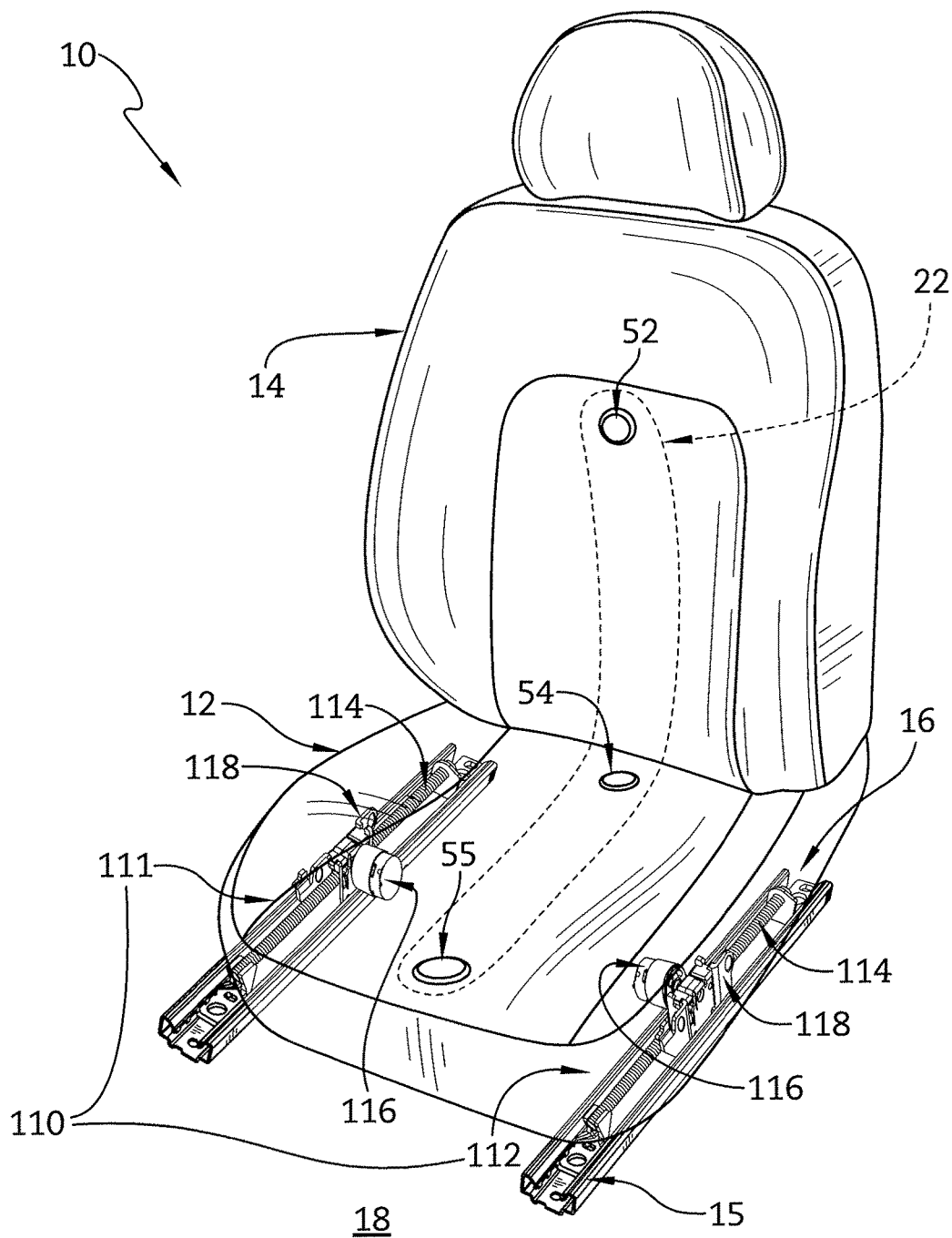
FIG. 3 is a perspective view of a first illustrative vehicle seat in accordance with the present disclosure showing that the slide mover includes left and right side assemblies.

The slide mover 110 is illustratively mounted to the seat bottom 12 and includes a left side assembly 111 and a right side assembly 112 arranged along corresponding sides of the seat bottom 12 as shown in FIG. 3. Each assembly 111, 112 is substantially the same and only the right side assembly 112 is further described. However, the following description of the right side assembly 112 is equally applied to the left side assembly 111.

Figure 4:
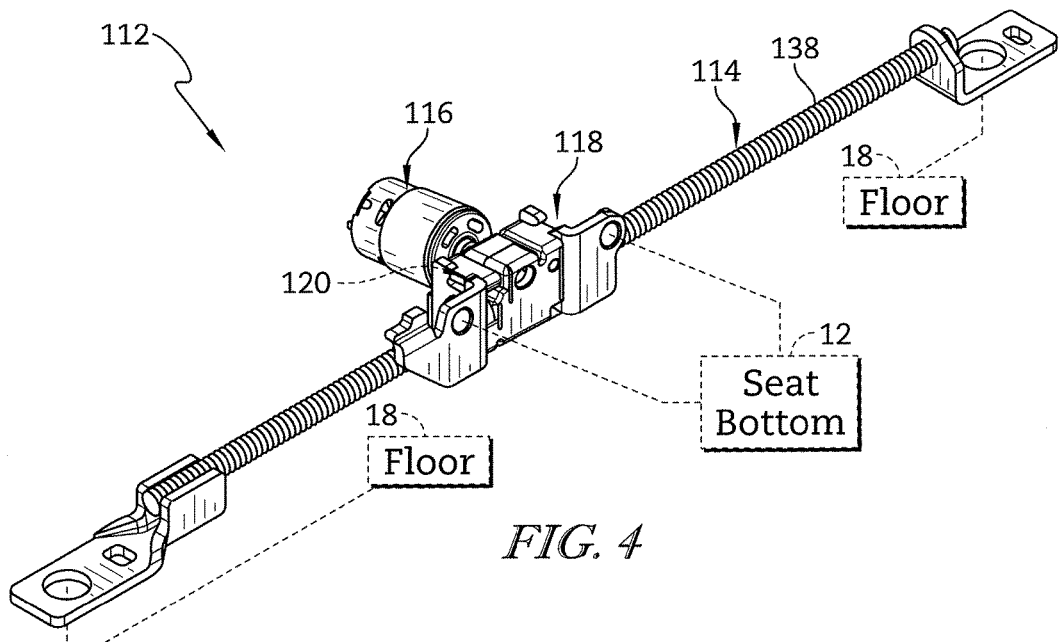
FIG. 4 is a detail perspective view of the right side assembly of the slide mover shown in FIG. 3 showing that the right side assembly includes a threaded rod adapted to be coupled to the floor and a motor adapted to be coupled to the seat bottom via a bracket.
Figure 5:
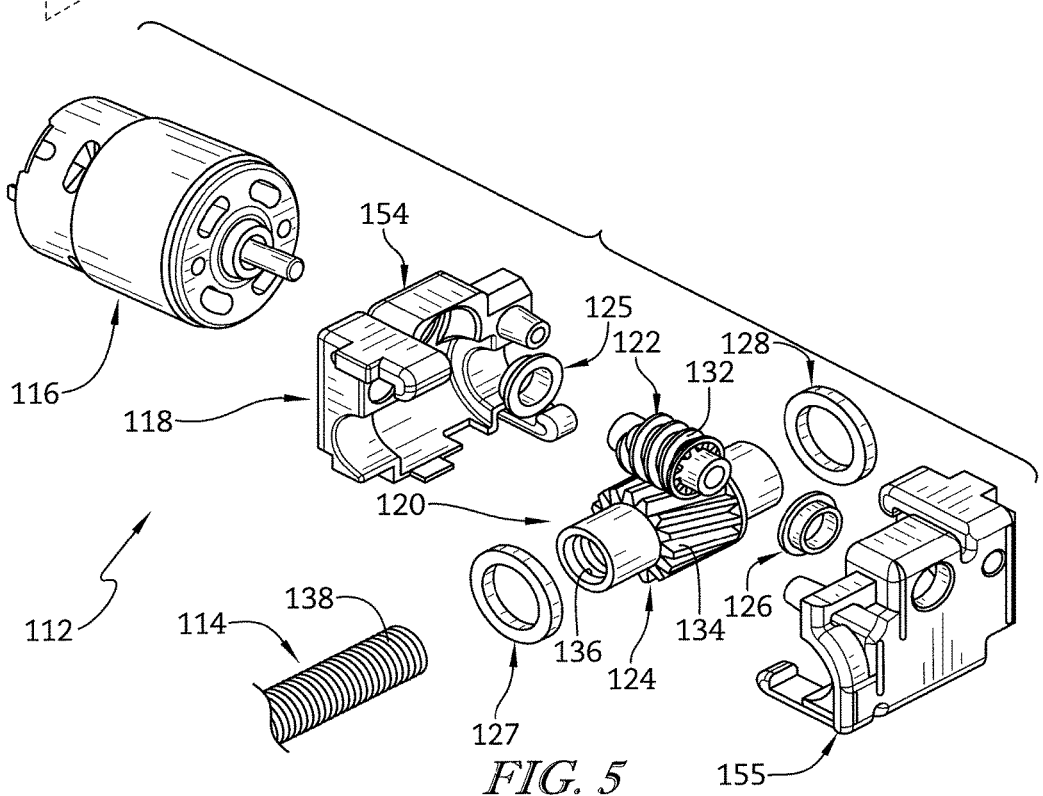
FIG. 5 is an exploded assembly perspective view of the right side assembly of FIG. 4 showing that the right side assembly includes a worm gear and a worm wheel housed in the bracket and showing that the worm gear is coupled to the motor to be driven by the motor and the worm wheel has external threads intermeshed with the worm gear and internal threads intermeshed with the threaded rod.

The right side assembly 112 of the slide mover 110 illustratively includes a threaded rod 114 adapted to be coupled to the floor 18 and a motor 116 adapted to be coupled to the seat bottom 12 via a bracket 118 as shown in FIGS. 4 and 5. The right side assembly 112 also includes a worm gear set 120 housed in the bracket 118 that interconnects the threaded rod 114 with the motor 116 so that the bracket 118 (and the seat bottom 12) is moved along the threaded rod 114 (and the floor 18) when the motor 116 rotates.

The worm gear set 120 illustratively includes a worm gear 122 and a worm wheel 124 as shown in FIG. 5. The worm gear 122 is mounted on bushings 125, 126 for rotation within left and right portions 154, 155 of the bracket 118 and is coupled to the motor 116 to be directly driven by the motor 116. The worm wheel 124 is mounted on bushings 127, 128 for rotation within the bracket 118 and is intermeshed with threads 132 of the worm gear 122 to be driven by the worm gear 122. More specifically, the worm wheel 124 has external threads 134 intermeshed with external threads 132 of the worm gear 122 and has internal threads 136 intermeshed with threads 138 of the threaded rod 114. The interaction of the worm gear set 120 with the threaded rod 114 provides braking that blocks the bracket 118 and the passenger support 11 from movement along the floor 18 when the motor 116 is not rotating.

In the illustrative embodiment, the sensor unit 22 includes seat back sensors 52 and seat bottom sensors 54, 55 as shown diagrammatically in FIG. 2 and illustratively in FIG. 3. The seat back sensors 52 are configured to detect forward and rearward slide motion-activation forces 30, 40 applied to the seat back 14 of the vehicle seat 10. The seat bottom sensors 54, 55 are configured to detect forward and rearward slide motion-activation forces 30, 40 applied to the seat bottom 12 of the vehicle seat 10. The seat bottom sensors 54, 55 may also detect if a passenger is supported on the seat bottom 12. The sensors 52, 54, 55 are illustratively force sensors but may be accelerometers, touch sensors, or any other suitable sensor.

Forward slide motion-activation forces 30 illustratively include user interactions such as a push 31, a pull 32, or a gesture 33 as shown in FIG. 2. Similarly, rearward slide motion-activation forces 40 illustratively include user interactions such as a push 41, a pull 42, or a gesture 43 as shown in FIG. 2. In one example, a user may pull forward or push backward with his legs on the seat bottom 12 while seated in the vehicle seat 10 to cause the passenger support 11 to slide forward or rearward along the floor 18 as suggested by arrow 11S in FIG. 1. In another example, a user may apply a push on the front side 14F of the seat back 14 to cause the passenger support 11 to slide rearwardly toward the vehicle back 102 as suggested in FIGS. 17 and 18.

In still other examples, a user may apply a gesture like a double tap onto the seat back 14 to cause movement of the passenger support 11. In the illustrative embodiment, gestures 33, 43 comprise a predetermined input such as a series of taps, a sequence of pushes and pulls, or the like detected by the sensor unit 22 that cause the seat motion system 16 to take predetermined actions. For example, a double tap on the back side 14B of seat back 14 may result in sliding of the passenger support 11 to a full-forward position. In such embodiments, the sensor unit 22, the controller 24, and the slide mover 110 cooperate to provide a gesture adjustment system 1512 as further described herein.

Figure 6:
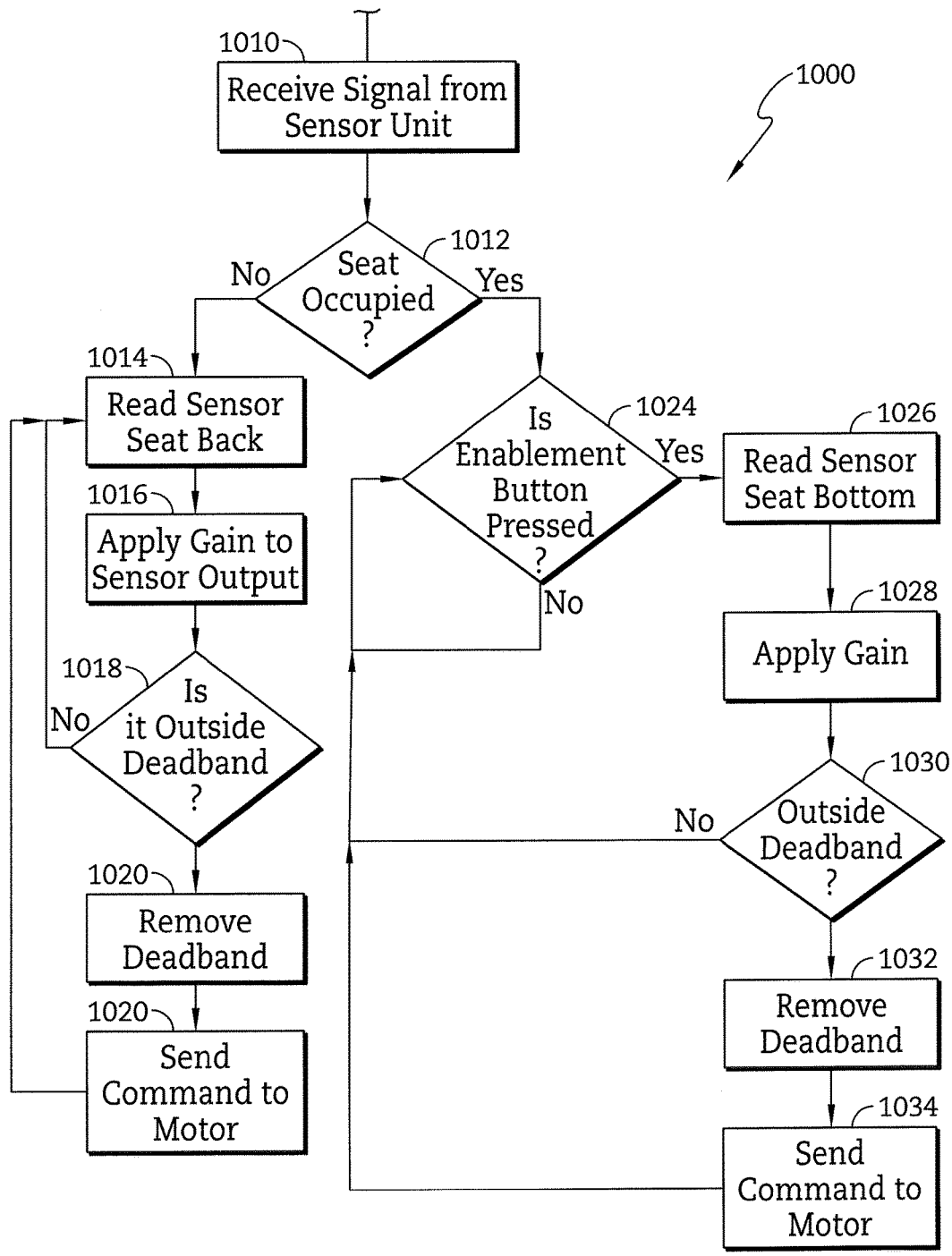
FIG. 6 is a block diagrammatic of an process performed by the controller included in the seat motion system to operate the slide mover and cause motion of the seat bottom and seat back along the floor.

A process 1000 performed by the controller 24 included in the seat motion system 16 to operate the slide mover 110 and cause motion of the passenger support 11 along the floor 18 is shown in FIG. 6. In a step 1010 of the process 1000, the controller 24 receives signals from the sensors 52, 54, 55 of the sensor unit 22 associated with slide motion-activation forces. Upon receipt of receipt of signals from the sensor unit 22, the controller 24 proceeds to a step 1012 of the process 1000.

In step 1012, the controller 24 determines if the vehicle seat 10 is occupied by a passenger as shown in FIG. 6. In the illustrative embodiment, the controller 24 determines that the vehicle seat 10 is occupied if the seat bottom sensors 54, 55 indicate forces associated with a person sitting on the seat bottom 12. If the vehicle seat 10 is not occupied, the controller 24 will proceed to a step 1014 in order to operate the slide mover 110 in response to forces applied to the seat back 14. If the vehicle seat 10 is occupied, the controller 24 will proceed to a step 1024 in order to operate the slide mover 110 in response to forces applied to the seat bottom 12.

In step 1014, the controller 24 reads seat back sensors 52 to determine the amount of force applied to the front side 14F or the back side 14B of the seat back 14 as suggested in FIG. 6. Then, the controller 24 applies gain to the output of the sensors 52 in a step 1016. After application of the gain in step 1016, the controller 24 determines if the resulting output is outside of a deadband range in a step 1018. If the output is not outside the deadband range, the controller 24 loops back to step 1014. If the output is outside the deadband range, the controller 24 advances to a step 1020 in which the controller 24 accounts for deadband output before sending signals to operate the slide mover 110.

In step 1020, the controller removes the deadband portion of the output received from the total output received as shown in FIG. 6. Thus, the controller 24 to reduces or eliminates oscillation of activation/deactivation by the controller 24. When this portion of the output is removed, the controller 24 proceeds to a step 1022 of the process 1000 and powers the motor 116 to drive the passenger support 11 of the vehicle seat 10 forward or rearward along the floor 18.

Turning back to step 1024, performed if it is determined that the vehicle seat 10 is occupied, the controller 24 determines if the enablement button 61 has been pressed as shown in FIG. 6. By pressing the enablement button 61, the passenger indicates that he is ready to reposition passenger support 11. In other embodiments, other user inputs may be used to indicate that the passenger is ready to reposition the vehicle seat 10. If it is determined that the enablement button 61 has not been pressed, the controller 24 loops back to step 1024 and waits for the button 61 to be pressed. If it is determined that the enablement button 61 has been pressed, the controller 24 advances to a step 1026.

In step 1026, the controller the controller 24 reads seat bottom sensors 54, 55 to determine the amount of force applied to the front side 14F or the back side 14B of the seat back 14 as suggested in FIG. 6. Then, the controller 24 applies gain to the output of the sensors 54, 55 in a step 1028. After application of the gain in step 1028, the controller 24 determines if the resulting output is outside of a deadband range in a step 1030. If the output is not outside the deadband range, the controller 24 loops back to step 1024. If the output is outside the deadband range, the controller 24 advances to a step 1034 in which the controller 24 accounts for deadband output before sending signals to operate the slide mover 110.

In step 1032, the controller removes the deadband portion of the output received from the total output received as shown in FIG. 6. Thus, the controller 24 to reduces or eliminates oscillation of activation/deactivation by the controller 24. When this portion of the output is removed, the controller 24 proceeds to a step 1034 of the process 1000 and powers the motor 116 to drive the passenger support 11 of the vehicle seat 10 forward or rearward along the floor 18.

In some embodiments, the controller 24 may determine if a vehicle drive train is engaged such that the vehicle including the vehicle seat 10 before powering the motor 116 in steps 1022, 1034. In one example, the controller 24 may disallow movement of the passenger support 11 of the vehicle seat 10 along the floor 18 when the vehicle is moving or is moving at a speed above a predetermined threshold. In another example, the controller 24 may disallow movement of the passenger support 11 of the vehicle seat 10 along the floor 18 when a key fob associated with the vehicle is not detected within a predetermined range of the vehicle. In another example, the controller 24 may allow movement of the passenger support 11 of the vehicle seat 10 along the floor 18 only when an enablement button is pressed before or during movement. In yet another example, the controller 24 may disallow movement of the passenger support 11 of the vehicle seat 10 along the floor 18 when a proximity sensor coupled to the controller 24 detects an object blocking movement of the vehicle seat 10.

In the illustrative embodiment, the load cells comprising the sensors 52, 54, 55 of the sensor unit 22 are zeroed during operation of the vehicle seat 10. A rolling average of ~10 values is constantly computed ahead of any state change. When a state change occurs, that rolling average is stopped and the most recent average becomes the value used to compare input signals.

Figure 7:
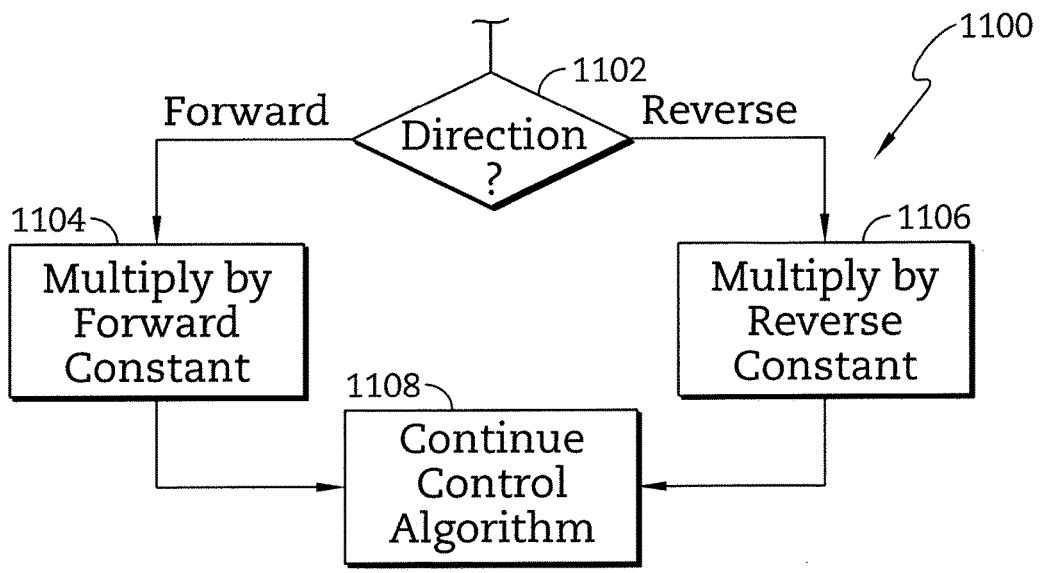
FIG. 7 is a block diagram of an optional process performed by the controller included in the seat motion system to apply gain to a sensor output when the seat motion system operates the slide mover in response to a user pushing or pulling the seat back.

Turning now to FIG. 7, a process 1100 performed by the controller 24 for applying gain to signals from the sensor unit 22 is shown. The process 1100 takes into account that a passenger is typically able to apply more force pushing the seat bottom 12 rearwardly than pulling the seat bottom 12 forwardly while seated on the seat bottom 12. The process 1100 also takes into account that a passenger is typically able to apply more force pushing the seat back 14 forwardly than pulling the seat back 14 rearwardly when standing adjacent to the vehicle seat 10.

In a step 1102 of the process 1100, the controller 24 determines if the signals received from the sensor unit 22 correspond to forward or reverse movement of the passenger support 11 as shown in FIG. 6. If it is determined that the signals correspond to forward movement of the passenger support, the controller 24 multiplies the received signal by a forward constant in a step 1104. If it is determined that the signals correspond to reverse (rearward) movement of the passenger support, the controller 24 multiplies the received signal by a reverse constant in a step 1106.

Upon multiplication of the signals received, the controller 24 has added sufficient gain to the signals from the sensor unit 22. The controller 24 then proceeds to a step 1108 in which a larger control algorithm (e.g. process 1000) continues.

Figure 8:
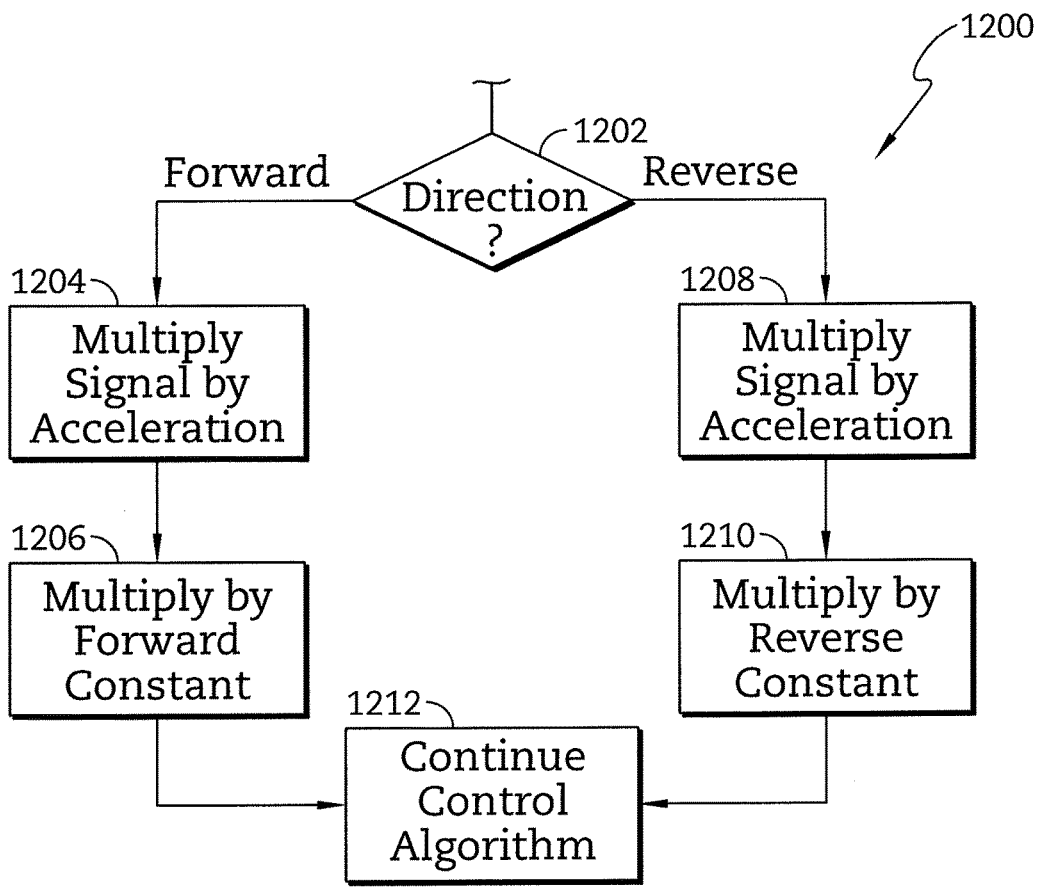
FIG. 8 is a block diagram of an optional process performed by the controller included in the seat motion system to apply gain to a sensor output when the seat motion system operates the slide mover in response to a user pushing or pulling the seat back.

Turning now to FIG. 8, another process 1200 performed by the controller 24 for applying gain to signals from the sensor unit 22 is shown. The process 1200 takes into account motion of the passenger support 11 to prevent the slide mover 110 from running the passenger support 11 away from the user too quickly. The process 1200 also takes into account that a passenger ability to apply force forwardly and rearwardly onto the seat bottom 12 and/or seat back 14 much like the process 1100 described above. In a step 1202 of the process 1200, the controller 24 determines if the signals received from the sensor unit 22 correspond to forward or reverse movement of the passenger support 11.

If it is determined in step 1202 that the signals correspond to forward movement of the passenger support, the controller 24 multiplies the received signal by acceleration and direction constants as shown in FIG. 6. Particularly, the controller 24 multiplies the received signal by the acceleration of the passenger support 11 in the forward direction in a step 1204 and by a forward constant in a step 1206.

If it is determined in step 1202 that the signals correspond to reverse movement of the passenger support, the controller 24 multiplies the received signal by acceleration and direction constants as shown in FIG. 6. Particularly, the controller 24 multiplies the received signal by the acceleration of the passenger support 11 in the reverse direction in a step 1208 and by a reverse constant in a step 1210.

Upon multiplication of the signals, the controller 24 has added sufficient gain to the signals from the sensor unit 22. The controller 24 then proceeds to a step 1212 in which a larger control algorithm (e.g. process 1000) continues.

Figure 9:
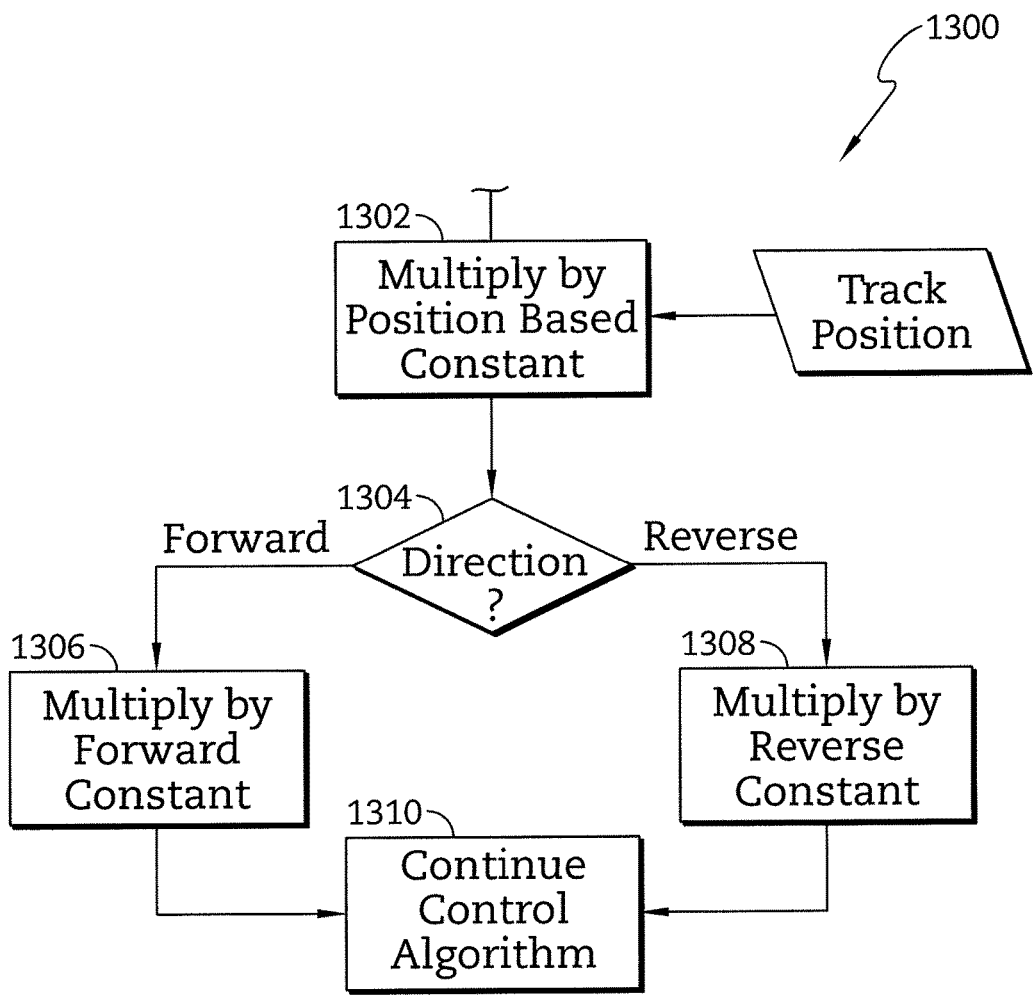
FIG. 9 is a block diagram of an optional process performed by the controller included in the seat motion system to apply gain to a sensor output when the seat motion system operates the slide mover in response to a user pushing or pulling the vehicle seat while seated.

Turning now to FIG. 9, yet another process 1300 performed by the controller 24 for applying gain to signals from the sensor unit 22 is shown. The process 1300 takes into account the position of the passenger support 11 along the track 15 since passengers are able to apply more force to the seat bottom 12 and/or seat back 14 at different locations along the track 15. The process 1300 also takes into account that a passenger ability to apply force forwardly and rearwardly onto the seat bottom 12 and/or seat back 14 much like the process 1100 described above.

In a step 1302 of the process 1300, the controller 24 multiplies the received signal from the sensor unit 22 by a position constant corresponding to a track position received from the track position sensor 62 as shown in FIG. 9. The controller 24 then performs a step 1304 and determines if the signals received from the sensor unit 22 correspond to forward or reverse movement of the passenger support 11. If it is determined that the signals correspond to forward movement of the passenger support, the controller 24 multiplies the received signal by a forward constant in a step 1306. If it is determined that the signals correspond to reverse (rearward) movement of the passenger support, the controller 24 multiplies the received signal by a reverse constant in a step 1308.

Upon multiplication of the signals received, the controller 24 has added sufficient gain to the signals from the sensor unit 22. The controller 24 then proceeds to a step 1310 in which a larger control algorithm (e.g. process 1000) continues.

A first embodiment of a gesture-adjustment system 1512 that performs a gesture-adjustment process 1510 is shown in FIGS. 10-19. Gesture-adjustment system 1512 adjusts vehicle seats 1521-1526 of a vehicle 1505 to positions and orientations desired by users 1514, 1516 based on gesture-based inputs applied by users 1514, 1516 to vehicle seats 1521-1526. Gesture-adjustment system 1512 determines the gestures that were applied by users 1514, 1516, maps the determined gestures to vehicle seat adjustments that correspond to the gestures, and implements the vehicle seat adjustments, as shown in FIGS. 10-12. In response, vehicle seats 1521-1526 are adjusted to the positions and orientations desired by users 1514, 1516, as suggested in FIG. 11. A second embodiment of a gesture-adjustment system 1612 is shown in FIGS. 20-22C. Gesture-adjustment system 1612 is similar to the gesture-adjustment system 1512 of FIGS. 10-19, but also factors in the current status of vehicle 1505, including whether vehicle 1505 is in a transmit-mode, passenger-entry mode, or cargo-loading mode, to select vehicle adjustments that are appropriate for the current status of vehicle 1505. Gesture-adjustment system 1612 also includes resistance detectors 1614 that prevent vehicle seats 1521-1526 from damaging cargo 1616 located in the movement path of vehicle seats 1521-1526, and passenger detectors 1615 that prevent vehicle seats 1521-1526 that are occupied by passengers from moving.

A first embodiment of a gesture-adjustment system 1512 that may be provided by the seat motion system 16 and that performs a gesture-adjustment process 1510 is shown in FIGS. 10-19. Gesture-adjustment system 1512 can accept a variety of gesture-based inputs from users 1514, 1516, as shown in FIGS. 10 and 13A-16. Gesture-adjustment system 1512 adjusts vehicle seats 1521-1526 to desired positions and orientations in response to gesture-based inputs by identifying the gestures that were applied by users 1514, 1516, as shown in FIG. 18, and by mapping the gestures to corresponding vehicle seat adjustments, as shown in FIG. 19. Gesture-adjustment system 1512 implements appropriate vehicle seat adjustments through actuation unit 1540, which moves seat bottoms 1521b, 1522b, 1523b, 1524b, 1525b, 1526b forward or backward longitudinally in accordance with the vehicle seat adjustments and which pivots seat backs 1521a, 1522a, 1523a, 1524a, 1525a, 1526a down towards seat bottoms 1521b, 1522b, 1523b, 1524b, 1525b, 1526b or up away from seat bottoms 1521b, 1522b, 1523b, 1524b, 1525b, 1526b by angular amounts in accordance with the vehicle seat adjustments.

For example, FIG. 10 shows user 1514 applying a double-tap gesture 1531 (depicted in FIG. 13B) to a rear surface 1523c of seat back 1523a of second-row vehicle seat 1523 to move second-row vehicle seat 1523 forward longitudinally, as this will better accommodate passenger 1515 who seeks to enter vehicle 1505 and occupy third-row vehicle seat 1525. Gesture-adjustment system 1512 is configured to respond to double-tap gesture 1531 by moving second-row vehicle seat 1523 to a full-forward position, which accommodates passenger 1515, as suggested in FIGS. 11 and 13B. Similarly, FIG. 10 illustrates that user 1516 applies a double-swipe gesture 1532 (depicted in FIG. 15A) to a rear surface 1526c of seat back 1526a of third-row vehicle seat 1526 to pivot seat back 1526a down towards seat bottom 1526b to better accommodate cargo 1534 being loaded into vehicle 1505. Gesture-adjustment system 1512 is configured to respond to double-swipe gesture 1532 by pivoting seat back 1526a down such that third-row vehicle seat 1526 assumes a full-fold position, as shown in FIGS. 11 and 15A. This enables user 1516 to stow cargo 1534 on top of seat back 1526a, as suggested in FIG. 11. Gesture-adjustment system 1512 can accommodate various other types of gestures that corresponding to various other types of vehicle seat adjustments, as shown in FIGS. 13A-19.

Gesture-adjustment system 1512 includes sensors 1530, a gesture-controller 1535, and an actuation unit 1540, as shown in FIG. 12. Gesture-adjustment system 1512 accepts gesture-based inputs from users 1514, 1516 as shown in FIGS. 13A-16 and receives signals from sensors 1530 that are indicative of the gesture-based inputs applied by users 1514, 1516, as shown in FIG. 18. Gesture-adjustment system 1512 processes and analyzes the signals to determine the gestures that users 1514, 1516 intended, as shown in FIGS. 12 and 18. Gesture-controller 1535 maps the determined gestures to vehicle adjustments corresponding to the determined gestures, as shown in FIGS. 12 and 19. Gesture-controller 1535 generates a vehicle seat adjustment signal reflecting the vehicle seat adjustments corresponding to the determined gesture and transmits the vehicle seat adjustment signal to actuation unit 1540, as shown in FIG. 12. Actuation unit 1540 implements the vehicle seat adjustments, as suggested in FIG. 12.

In more detail, gesture-adjustment system 1512 performs gesture-adjustment process 1510 as shown in FIG. 12. Gesture-adjustment process 1510 begins with an accepting step 1552, in which gesture-controller 1535 accepts gesture-based inputs, as further shown in FIGS. 13A-16. Gesture-adjustment process 1510 proceeds to processing step 1554, in which gesture-controller 1535 processes signals from sensors 1530 indicative of the gesture-based inputs, as further shown in FIG. 18. Gesture-adjustment process 1510 then proceeds to identifying step 1556, which identifies characteristics of the received signals that gesture-controller 1535 can use to distinguish among different types of gestures, as further shown in FIG. 18. Gesture-adjustment process 1510 then proceeds to a determining step 1558, in which gesture-controller 1535 uses the identified gesture-determining characteristics to determine the gesture that users 1514, 1516 intended to apply.

Gesture-adjustment process 1510 then proceeds to a mapping step 1560, in which gesture-controller 1535 maps the intended gesture to corresponding vehicle adjustments, as shown in FIG. 19. Gesture-adjustment process 1510 then proceeds to an encoding step 1562, which generates a vehicle adjustment signal encoded to reflect the vehicle adjustment to be implemented. Gesture-adjustment process 1510 then proceeds to transmitting step 1564, which transmits the encoded vehicle adjustment signal to actuation unit 1540. Actuation unit 1540 implements the vehicle adjustments, as suggested in FIG. 12. Actuation unit 1540 moves seat bottoms 1521b, 1522b, 1523b, 1524b, 1525b, 1526b forward or backward longitudinally in accordance with the vehicle adjustment signal, and pivots seat backs 1521a, 1522a, 1523a, 1524a, 1525a, 1526a down towards seat bottoms 1521b, 1522b, 1523b, 1524b, 1525b, 1526b or up away from seat bottoms 1521b, 1522b, 1523b, 1524b, 1525b, 1526b by angular mounts in accordance with the vehicle adjustment signal.

As explained, gesture-adjustment process 1510 begins with accepting step 1552 illustrated in FIGS. 12 and 13A-16. In accepting step 1552, gesture-adjustment system 1512 accepts gesture-based inputs applied to vehicle seats 1521-1526 by users 1514, 1516. FIGS. 13A-13C show exemplary forward-motion gestures that gesture-adjustment system 1512 may accept to move vehicle seat 1523 forward longitudinally. FIGS. 14A-14C show exemplary backward-motion gestures that gesture-adjustment system 1512 may accept to move vehicle seat 1523 backward longitudinally. FIGS. 15A-15B show exemplary swiping gestures that gesture-adjustment system 1512 may accept to pivot seat back 1526a down towards seat bottom 1526b or up away from seat bottom 1526b. FIG. 16 shows a variety of gesture-based inputs that a user can draw onto a touch-sensitive surface 1526f disposed on a rear surface 1526c of seat back 1526a to achieve various vehicle seat adjustments.

FIGS. 13A-14C suggest that vehicle seat 1523 may occupy one of several predetermined memory positions P1-P5. In this illustrative embodiment, memory positions P1-P5 are equally spaced along a longitudinal direction, with memory position P1 being a full-back position (i.e., the position closest to the rear of vehicle 1505), memory position P5 being a full-forward position (i.e., the position closest to the front of vehicle 1505), and memory positions P2, P3, and P4 being intermediately located between memory positions P1 and P5 at equally spaced intervals. Memory positions P1-P5 may be preconfigured and stored in a memory module (not shown) of vehicle 1505. Actuation unit 1540 moves vehicle seat 1523 to any one of memory positions P1-P5 in accordance with vehicle seat adjustment signals that it receives. To achieve longitudinal movement of vehicle seat 1523, actuation unit 1540 moves vehicle seat bottom 1523b longitudinally through powered or manual means, as will be discussed below.

FIGS. 13A-13C show exemplary forward-motion gestures that enable user 1514 to longitudinally adjust vehicle seat 1523 among memory positions P1-P5. Forward-motion gestures include a single-tap gesture 1572 shown in FIG. 13A, a double-tap gesture 1574 shown in FIG. 13B, and a press-and-hold gesture 1576 shown in FIG. 13C. A single-tap gesture may include user 1514 pressing a finger, hand, or object against a rear surface 1523c of seat back 1523a for a relatively short period of time. Illustratively, user 1514 applies pressure proximal to sensors 1530 (shown in FIGS. 12 and 17) disposed within vehicle seat 1523. In this illustrative embodiment, a single-tap gesture 1572 causes gesture-adjustment system 1512 to move vehicle seat 1523 to a next sequential longitudinal position, as shown in FIG. 13A. Thus, in response to single-tap gesture 1572, gesture-adjustment system 1512 moves vehicle seat 1523 from P1 to P2, from P2 to P3, from P3 to P4, or from P4 to P5, depending on the initial memory position P1-P5 of vehicle seat 1523.

A double-tap gesture 1574 applied to a rear surface 1523c of seat back 1523a causes gesture-adjustment system 1512 to move vehicle seat 1523 to a full-forward memory position P5, as shown in FIG. 13B. A double-tap gesture 1574 may be similar to a single-tap gesture 1572, but may include user 1514 pressing a finger, hand, or object against a rear surface 1523c of seat back 1523a twice in relatively rapid succession. Thus, in response to double-tap gesture 1574, gesture-adjustment system 1512 moves vehicle seat 1523 to memory position P5 regardless of which memory position P1-P5 vehicle seat 1523 was previously occupying.

A press-and-hold gesture 1576 applied to a rear surface 1523c of seat back 1523a causes gesture-adjustment system 1512 to move vehicle seat 1523 for the duration of time that user 1514 presses against rear surface 1523c, as suggested in FIG. 13C. Press-and-hold gesture 1576 may include user 1514 pressing against rear surface 1523c with a finger, hand, or object for a duration of time. In response, vehicle seat 1523 begins moving forward longitudinally. User 1514 may continue press-and-hold gesture 1576 by applying continued pressure to rear surface 1523c, following vehicle seat 1523 as it moves forward longitudinally. Vehicle seat 1523 continues to move forward longitudinally until such time that user 1514 releases rear surface 1523c. In illustrative embodiments, the more pressure that user 1514 applies to rear surface 1523c, the faster vehicle seat 1523 moves. This enables user 1514 to control the speed with which vehicle seat 1523 moves forward longitudinally.

Thus, in the illustrative example of FIG. 13C, vehicle seat 1523 begins at memory position P1, at which time user 1514 initiates press-and-hold gesture 1576. Vehicle seat 1523 moves forward longitudinally, and when vehicle seat 1523 is positioned at memory position P3, user 1514 releases rear surface 1523c. In response, vehicle seat 1523 ceases longitudinal movement.

FIGS. 14A-14C illustrate similar gestures and vehicle seat adjustments as FIGS. 13A-13C, but show exemplary backward-motion gestures rather than forward-motion gestures. In this illustrative embodiment, gesture-adjustment system 1512 moves vehicle seat 1523 backward longitudinally in response to user 1514 applying gesture-based inputs to a front surface 1523d of seat back 1523a of vehicle seat 1523. Thus, a single-tap gesture 1572 applied to front surface 1523d of seat back 1523a moves vehicle seat backward longitudinally to an immediately preceding memory position, as shown in FIG. 14A—i.e., from P5 to P4, from P4 to P3, from P3 to P2, or from P2 to P1, depending on the initial position of vehicle seat 1523. A double-tap gesture 1574 applied to front surface 1523d of seat back 1523a moves vehicle seat backward longitudinally to a full-back position P1, irrespective of which of memory position P1-P5 vehicle seat 1523 previously occupied, as suggested in FIG. 14B. A press-and-hold gesture 1576 applied to front surface 1523d of seat back 1523a moves vehicle seat backward longitudinally for the duration of time that user 1514 presses against front surface 1523d, as suggested in FIG. 14C.

Although illustrated with reference to vehicle seat 1523, the gesture-based inputs and vehicle seat adjustments described above may apply to any of vehicle seats 1521-1526.

In addition to longitudinal movement of vehicle seats 1521-1526, gesture-adjustment system 1512 may also accept gesture-based inputs that pivot seat backs 1521a, 1522a, 1523a, 1524a, 1525a, and 1526a downwards towards or upwards away from seat bottoms 1521b, 1522b, 1523b, 1524b, 1525b, and 1526b. FIGS. 15A-15B show swiping gestures that may result in such pivoting with reference to illustrative vehicle seat 1526. Vehicle seat 1526 includes a pivot 1526e about which seat back 1526a can pivot down towards or upwards away from seat bottom 1526b.

FIGS. 15A-B suggest that vehicle seat 1526 may occupy one of five predetermined rotational memory positions R1-R5. In this illustrative embodiment, rotational memory positions R1-R5 are at angles roughly equally spaced about the rotational axis of pivot 1526e, with rotational memory position R1 corresponding to a full-upright position, rotational memory position R5 corresponding to a full-fold position, and rotational memory positions R2-R4 intermediately located between R1 and R5 at equally spaced angular intervals. Rotational memory positions R1-R5 may be stored in a memory module (not shown) of vehicle 1505. Actuation unit 1540 can orient vehicle seat 1526 to any one of rotational memory positions R1-R5 by accessing the memory module (not shown) and rotating seat back 1526*a* of vehicle seat 1526 to the appropriate angular position through powered or manual means, as will be discussed below.

FIG. 15A shows exemplary downward-swiping gestures applied by user 1516 to a rear surface 1526*c* of seat back 1526*a* to pivot seat back 1526*a* downwards, including a single-swipe downward gesture 1628, a double-swipe downward gesture 1630, and a sustained-swipe downward gesture 1632. In this illustrative embodiment, a single-swipe downward gesture 1628 causes gesture-adjustment system 1512 to rotate seat back 1526*a* to a next sequential rotational memory position R1-R5. A single-swipe downward gesture 1628 may include user 1516 dragging a finger, hand, or other object along rear surface 1526*c* of seat back 1526*a* at a relatively rapid rate and for a relatively short distance. Thus, in response to a single-swipe downward gesture 1628, gesture-adjustment system 1512 rotates seat back 1526*a* from R1 to R2, from R2 to R3, from R3 to R4, or from R4 to R5, depending on the initial rotational memory position R1-R5 of seat back 1526*a*.

A double-swipe downward gesture 1630 causes gesture-adjustment system 1512 to rotate seat back 1526*a* to full-fold position R5, regardless of which rotational memory position R1-R5 seat back 1526*a* initially occupies. A double-swipe downward gesture 1630 may include two single-swipe gestures executed in relatively rapid succession.

A sustained-swipe downward gesture 1632 causes gesture-adjustment system 1512 to rotate seat back 1526*a* downward towards seat bottom 1526*b* for the duration of time that user 1514 drags a finger down rear surface 1526*c* of seat back 1526*a*. A sustained-swipe downward gesture 1632 may include a user 1516 dragging a finger, hand, or other object along rear surface 1526*c* of seat back 1526*a* at a relatively slow rate and for a relatively long distance. Thus, in the illustrative example of FIG. 15A, seat back 1526*c* begins at rotational memory position R1, at which time user 1516 applies pressure to rear surface 1526*c* of seat back 1526*a* at an upper location 1635. As user 1516 swipes downwards, seat back 1526*a* pivots down towards seat bottom 1526*b*. User 1516 ultimately disengages from rear surface 1526*c* at a lower location 1637, at which time seat back 1526*a* ceases rotational movement. In illustrative embodiments, the speed and/or amount of pressure with which user 1516 applies sustained-swipe downward gesture 1632 impacts the speed with which seat back 1526*a* pivots. For example, a sustained-swipe downward gesture 1632 that applies more pressure to rear surface 1526*c* or that is relatively rapid may result in seat back 1526*a* pivoting at a faster rate.

FIG. 15B is similar to FIG. 15A, but shows exemplary upward-swiping gestures applied by user 1516 to a rear surface 1526*c* of seat back 1526*a* to pivot seat back 1526*a* upwards away from seat bottom 1526*b*, including a single-swipe upward gesture 1640, a double-swipe upward gesture 1642, and a sustained-swipe upward gesture 1644. In this illustrative embodiment, a single-swipe upward gesture 1640 causes gesture-adjustment system 1512 to rotate seat back 1526*a* to an immediately preceding rotational memory position—i.e., gesture-adjustment system 1512 rotates seat back 1526*a* from R5 to R4, from R4 to R3, from R3 to R2, or from R2 to R1, depending on the initial rotational memory position R1-R5 of seat back 1526*a*. A double-swipe upward gesture 1642 causes gesture-adjustment system 1512 to pivot seat back 1526*a* to a full-upright position R1, regardless of which rotational memory position R1-R5 seat back 1526*a* initially occupies. A sustained-swipe upward gesture 1644 causes gesture-adjustment system 1512 to rotate seat back 1526*a* upwards away from seat bottom 1526*b* for the duration of time that user 1514 applies sustained-swipe upward gesture 1644 along rear surface 1526*c* of seat back 1526*a*.

FIG. 16 shows still other gesture-based inputs that gesture-adjustment system 1512 may accept. In the illustrative embodiment of FIG. 16, vehicle seat 1526 includes a capacitive touch-sensitive surface 1526*f* disposed on rear surface 1526*c* of seat back 1526*a*. Touch-sensitive surface 1526*f* is capable of accepting and resolving gestures drawn by user 1516 onto touch-sensitive surface 1526*f*. In this illustrative embodiment, when user 1516 draws an upward-drag gesture 1650 on touch-sensitive surface 1526*f*, vehicle seat 1526 moves forward longitudinally by a distance 1651 proportional to length 1650*a* of upward-drag gesture 1650. Similarly, when user 1516 draws a downward-drag gesture 1652 on touch-sensitive surface 1526*f*, vehicle seat 1526 moves backward longitudinally by a distance 1653 proportional to length 1652*a* of downward-drag gesture 1652. In other illustrative embodiments, the speed with which user 1516 draws upward-drag gesture 1650 or downward-drag gesture 1652, and not lengths 1650*a*, 1652*a*, impacts the distances 1651, 1653 of longitudinal movement.

When user 1516 draws a counterclockwise hook gesture 1654, seat back 1526*a* rotates downwards towards seat bottom 1526*b* by a rotational amount proportional to the rotational extent of the counterclockwise hook gesture 1654. For example, if user 1516 draws a complete counterclockwise hook gesture 1654 through to location 1654*b*, vehicle seat 1526 will assume a full-fold position. If user 1516 draws only a partial counterclockwise hook gesture 1654 by stopping at location 1654*a*, vehicle seat 1526 will assume a partially-folded position. Likewise, if user draws a clockwise hook gesture 1656, seat back 1526*a* will rotate away from seat bottom 1526*b* by a rotational amount proportional to the rotational extent of the clockwise hook gesture 1656. Thus, drawing clockwise hook gesture 1656 through to completion to location 1656*b* results in vehicle seat 1526 occupying a full-upright position. Drawing a partial clockwise hook gesture 1656 by stopping at location 1656*a* results in vehicle seat 1526 occupying a partial-recline position. In illustrative embodiments, the speed with which user draws counterclockwise hook gesture 1654 or clockwise hook gesture 1656 impacts the speed with which seat back 1526*a* pivots.

Touch-sensitive surface 1526*f* may also resolve multiple touch points, which enables gesture-adjustment system 1512 to accommodate gesture-based inputs that move more than one vehicle seat 1521-1526 at a time. For example, when user 1516 draws a multi-touch upward-drag gesture 1658 on touch-sensitive surface 1526*f* of vehicle seat 1526, both vehicle seat 1526 and its neighboring vehicle seat 1525 move forward longitudinally. Similarly, when user 1516 draws multi-touch downward-drag gesture 1660, both vehicle seat 1526 and its neighboring vehicle seat 1525 move backward longitudinally. Although FIGS. 15A-16 were described with reference to exemplary vehicle seat 1526, similar gestures may be accepted in relation to any vehicle seats 1521-1526.

Although FIGS. 13A-16 illustrated gesture-adjustment system 1512 accepting gesture-based inputs on front and rear surfaces of seat backs 1521a, 1522a, 1523a, 1524a, 1525a, 1526a, gesture-adjustment system 1512 may accept gesture-based inputs at other locations, as illustrated in FIG. 17 with reference to exemplary vehicle seat 1526. Generally, gesture-based inputs may be accepted on any surface proximal to a sensor 1530 disposed within vehicle seat 1526.

FIG. 17 shows sensors 1530a-h disposed in various locations within vehicle seat 1526. Upper seat back sensor 1530a enables users 1514, 1516 to apply gesture-based inputs to an upper portion of seat back 1526a, while lower seat back sensor 1530d enables users 1514, 1516 to apply gesture-based inputs to a lower portion of seat back 1526a. Left and right side seat back sensors 1530b, 1530c enable a user to apply gesture-based inputs on left and right side surfaces 1526g, 1526h of seat back 1526a, respectively. Left and right side seat back sensors 1530b, 1530c may be convenient in situations when users 1514, 1516 have better access to left and right side surfaces 1526g, 1526h than rear surface 1526c and front surface 1526d, such as when users 1514, 1516 are approaching vehicle 1505 from the side to load cargo onto vehicle seat 1526.

FIG. 17 also shows center seat bottom sensor 1530e centrally located within seat bottom 1526b, which enables users 1514, 1516 to apply gestures directly on seat bottom 1526b. Left and right side seat bottom sensors 1530f, 1530g enable users 1514, 1516 to apply gestures on left and right side surfaces 1526i, 1526j, of seat bottom 1526b, respectively. Front seat bottom sensor 1530h enables users 1514, 1516 to apply gestures to a front surface 1526k of seat bottom 1526b. Left and right side seat bottom sensors 1530f, 1530g and front seat bottom sensor 1530h may be convenient when user 1514, 1516 is sitting on vehicle seat 1526. When sitting on vehicle seat 1526, user 1514, 1516 may conveniently be able to use a left hand to reach left side surface 1526i, a right hand to reach right side surface 1526j, or either hand to reach front surface 1526k of seat bottom 1526b. Left and right side seat bottom sensors 1530f, 1530g and front seat bottom sensor 1530h may be particularly convenient for use by a driver occupying first-row vehicle seat 1521, shown in FIGS. 11-12, to apply gesture-based inputs without removing his or her eyes from the road.

In addition to load cells and capacitive touch-sensitive surfaces described above, other types of sensors 1530 may be used as well. Examples include heat-activated sensors, proximity sensors, or motion-based sensors. In illustrative embodiments, gesture-adjustment system 1512 includes an optical detector, such as a camera (not shown), that collects image data regarding actions taken by users 1514, 1516 and implements gesture-detection techniques to determine which gestures users 1514, 1516 are performing. In illustrative embodiments, sensors 1530 may include audio detectors that receive audio commands, such as voice commands, to implement vehicle seat adjustments. Sensors 1530 need not be disposed on vehicle seats 1521-1526 but may instead be located on other surfaces within vehicle 1505. Sensors 1530 may also be disposed on separate hardware, and may include a touch screen interface of a mobile computing device.

The gesture-based inputs described above may be assigned as default gestures 1622, in that they are preprogrammed into gesture-adjustment system 1512 to result in the above-described vehicle adjustments at the time of distribution of vehicle 1505, as shown in FIG. 19. However, gesture-adjustment system 1512 may include user-configurable gestures 1624 in addition to default gestures 1622.

FIG. 19 shows a look-up table 1620 whose role in gesture-adjustment process 1510 will be described in further detail below. For present purposes, look-up table 1620 shows exemplary default gestures 1622, including those described above, as well as user-configurable gestures 1624.

User-configurable gestures 1624 may include gestures programmably configured by user 1514 to achieve desired preset vehicle seat adjustments. For example, user 1514 may programmably configure a particular gesture to correspond to an interior cleaning accommodation preset 1624a. Interior cleaning accommodation preset 1624a may move all vehicle seats 1521-1526 to full-forward longitudinal positions and all seat backs 1521a, 1522a, 1523a, 1524a, 1525a, 1526a to full-fold positions to better accommodate accessibility for vacuums and other cleaning equipment within the interior of vehicle 1505.

As another example, user 1514 may programmably configure a different gesture to correspond to an infant seat accommodation preset 1624b. Infant seat accommodation preset 1624b may move front-row vehicle seat 1522 to a longitudinally forward position to accommodate placement of an infant child safety seat (not shown) on second-row vehicle seat 1524.

As still another example, user 1514 may programmably configure a different gesture to correspond to a passenger entry accommodation preset 1624c. Passenger entry accommodation preset 1624c may move first-row vehicle seats 1521, 1522 and second-row vehicle seats 1523, 1524 forward longitudinally to accommodate passenger entry into second-row vehicle seats 1523, 1524 and third-row vehicle seats 1525, 1526, respectively. Passenger entry accommodation preset 1624c may also fold down first-row seat backs 1521a, 1522a and second-row seat backs 1523a, 1524a to accommodate passenger entry into second-row vehicle seats 1523, 1524 and third-row vehicle seats 1525, 1526, respectively.

User 1514 may select any suitable gestures to correspond to accommodation presets 1624a-c. For example, user 1514 may select any particular sequences of taps, press-and-holds, swipes, or other gesture types as corresponding to respective accommodation presets 1624a-c. Gesture-adjustment system 1512 may include a user interface (not shown) that enables user 1514 to select an accommodation preset 1624a-c to configure. In response to selecting an accommodation preset 1624a-c to configure, the user interface may prompt user 1514 to perform a desired gesture to associate with the selected accommodation preset 1624a-c. User 1514 may then perform a desired gesture—e.g., double-tap followed by a press-and-hold, triple-tap, etc. Gesture-adjustment system 1512 may then store and associate the performed gesture in look-up table 1620 with the selected accommodation preset 1624a-c, such that when user 1514 subsequently performs that gesture, vehicle seats 1521-1526 will be adjusted in accordance with the selected accommodation preset 1624a-c. In this manner, user 1514 can select any suitable gesture-based input to correspond with any predetermined arrangement of vehicle seats.

In illustrative embodiments, user 1514 can also program additional, customized accommodation presets (not shown) beyond those shown in FIG. 19. For example, user 1514 may have a particular type of cargo (e.g., a bulky musical instrument) that requires user 1514 to arrange vehicle seats 1521-1526 in a particular arrangement on a regular basis. Gesture-adjustment system 1512 may enable user 1514 to arrange vehicle seats 1521-1526 in a desired manner to accommodate the musical instrument, and then enable user 1514 to program that arrangement of vehicle seats 1521-1526 as an additional, customized accommodation preset (e.g., a "musical instrument accommodation preset"). Having created a new customized accommodation preset, user 1514 can proceed to program a particular gesture sequence to associate with the customized accommodation preset as described above. The customized accommodation preset and the associated user-configured gesture sequence may then be stored in look-up table 1620.

Returning to FIG. 12, in response to accepting gesture-based inputs, gesture-adjustment process 1510 proceeds to processing step 1554, which processes signals from sensors 1530 reflecting the gesture-based inputs, as shown in FIGS. 12 and 18. In illustrative embodiments, sensors 1530 are load cells that generate electrical signals in proportion to a magnitude of force detected by the load cells. Thus, when user 1514 applies pressure to a rear surface 1523c or a front surface 1523d of seat back 1523a, that pressure is transferred to sensors 1530 via intervening materials form which vehicle seat 1523 is fabricated. In response, sensors 1530 transmit electrical signals reflecting the amount of pressure applied by user 1514. Processing step 1554 may improve signal quality and remove noise, such as through use of filters, amplifiers, and the like.

For example, when user 1514 applies single-tap gesture 1572, as suggested in FIGS. 13A and 14A, sensor 1530 may transmit electrical signal 1582, shown in FIG. 18. Electrical signal 1582 is depicted as the output of sensor 1530 (e.g., current or voltage) as a function of time. Signal 1582 includes a single load spike 1582a corresponding to the point in time during single-tap gesture 1572 when the pressure applied by user 1514 to seat back 1523a reaches a relative maximum. When user 1514 applies double-tap gesture 1574, as suggested in FIGS. 13B and 14B, sensor 1530 may transmit signal 1584, also shown in FIG. 18. Signal 1584 includes two load spikes 1584a, 1584b corresponding to the two points in time during double-tap gesture 1574 when the pressure applied by user 1514 to seat back 1523a reaches relative maxima. When user 1514 applies press-and-hold gesture 1576, as suggested in FIGS. 13C and 14C, sensor 1530 may transmit signal 1586, which includes a load spike 1586a corresponding to the duration of time during which user 1514 applies consistent pressure to seat back 1523a.

Where gesture-adjustment system 1512 accepts gesture-based inputs having spatial components, such as swiping gestures illustrated in FIGS. 15A-15B or drag gestures illustrated in FIG. 16, sensors 1530 may be configured to generate signals (not shown) reflecting the pressure applied by user 1514 as both a function of time and space. For example, sensors 1530 may include arrays of load cells, with different load cells among the array responsible for measuring pressure at different respective spatial locations. Likewise, capacitive touch-sensitive surface 1526f may generate signals reflecting touch inputs as a function of time and space.

After processing step 1554, gesture-controller proceeds to identifying step 1556, shown in FIGS. 12 and 18, in which gesture-controller 1535 identifies gesture-determining characteristics within received signals 1582, 1584, 1586 that gesture-controller 1535 can use to distinguish among different gesture-based inputs. Gesture-determining characteristics may include the number of load spikes in received signals 1582, 1584, 1586, the respective heights of load spikes in received signals 1582, 1584, 1586, and the respective widths of load spikes in received signals 1582, 1584, 1586.

As shown in FIG. 18, identifying step 1556 begins with detecting step 1592, in which gesture-controller 1535 detects load spikes 1582a, 1584a, 1584b, 1586a in received signals 1582, 1584, 1586. For example, gesture-controller 1535 may include differentiator circuitry capable of identifying relative maxima among received signals 1582, 1584, 1586. Identifying step 1556 then proceeds to counting step 1594, in which gesture-controller 1535 counts the number of detected load spikes, represented in FIG. 15 as N. Thus, the number of detected load spikes N is N=1 for received signal 1582, N=2 for received signal 1584, and N=1 for received signal 1586.

Identifying step 1556 proceeds to determining step 1596, which determines a height $h_n$ of each load spike for n=1 . . . N. For example, gesture-controller 1535 may measure the amplitude of received signals 1582, 1584, 1586 at the location of each load spike 1582a, 1584a, 1584b, 1586a to determine heights $h_n$. Identifying step 1556 then proceeds to determining step 1598, which determines widths $w_n$ of each load spike for n=1 . . . N. For example, gesture-controller 35 may include differentiator circuitry capable of detecting when each load spike begins and ends, and may compute a time differential between those locations.

Gesture-controller 1535 then proceeds to determining step 1558, in which gesture-controller 1535 determines the gesture intended by user 1514 based on the identified gesture-determining characteristics N, $h_n$, and $w_n$. Determining step 1558 may be implemented by querying a database 1559 with the identified gesture-determining characteristics N, $h_n$, and $w_n$. Database 1559 may include tables and fields that correlate different load profiles with different types of gestures. By querying database 1559 with gesture-determining characteristics N, $h_n$, and $w_n$, database 1559 can determine a load profile to which gesture-determining characteristics N, $h_n$, and $w_n$ belong and return the corresponding gesture.

The manner by which load profiles are associated with gestures may depend on the particular gestures supported by gesture-adjustment system 1512 and the characteristics of those gestures. In this example, gesture-controller 1535 may determine that received signal 1582 corresponds to a single-tap gesture 1572 or a press-and-hold gesture 1576 because the number of load spikes is N=1. Gesture-controller 1535 may then compare the ratio of height $h_1$ of load spike 1582a to width $w_1$ of load spike 1582a to a predetermined threshold. If the ratio exceeds the predetermined threshold, gesture-controller 1535 concludes that user 1514 applied a single-tap gesture 1572, whereas if the ratio is below the predetermined threshold, gesture-controller 1535 concludes that user 1514 applied a press-and-hold gesture 1576. Because single-tap gesture 1572 includes applying pressure for a relatively short amount of time, the computed ratio of $h_1$ to $w_1$ for received signal 1582 will be relatively high, resulting in a determination that user 1514 applied a single-tap gesture 1572.

Similarly, gesture-controller 1535 may determine that received signal 1584 corresponds to a double-tap gesture 1574 because the number of load spikes is N=2, and because the ratios of height $h_1$ of load spike 1584a to width $w_1$ of load spike 1584a and the ratio of height h2 of load spike 1584b to width $w_2$ of load spike 1584b are both greater than a predetermined threshold, suggesting that user 1514 applied two taps. Finally, gesture-controller 1535 may determine that received signal 1586 corresponds to a press-and-hold gesture 1576 because the number of load spikes is N=1 and the ratio of height $h_1$ of load spike 1586a to width $w_1$ of load spike 1586a is less than the predetermined threshold, suggesting that user 1514 applied a press-and-hold gesture 1576.

Gesture-controller 1535 then proceeds to mapping step 1560, in which gesture-controller 1535 maps the intended gesture into a vehicle seat adjustment corresponding to the intended gesture, as shown in FIG. 19. Gesture-controller 1535 includes a look-up table 1620 that correlates different types of gestures with corresponding actions to be taken. By querying look-up table 1620, gesture-controller 1535 retrieves the appropriate vehicle adjustment for a given gesture-based input.

Returning to FIG. 12, gesture-adjustment process 1510 proceeds to encoding step 1562, which encodes the desired vehicle adjustment into an encoded vehicle adjustment signal. For example, gesture-controller 1535 may generate digital signals (not shown) in which predetermined patterns of bits correspond to particular vehicle seat adjustments. After encoding step 1562, gesture-controller 1535 may perform transmitting step 1564, which transmits the encoded vehicle adjustment signal to actuation unit 1540. Actuation unit 1540 implements the vehicle adjustments in accordance with the instructions in the encoded signal. As suggested in FIG. 12, actuation unit 1540 causes seat bottoms 1521b, 1522b, 1523b, 1524b, 1525b, and 1526b to move forward or backward longitudinally and causes seat backs 1521a, 1522a, 1523a, 1524a, 1525a, and 1526a to pivot down towards or up away from bottoms 1521b, 1522b, 1523b, 1524b, 1525b, and 1526b as appropriate in order to implement the vehicle seat adjustments in accordance with the encoded vehicle adjustment signal.

Actuation unit 1540 may reposition vehicle seats 1521-1526 using powered means and/or manual means. When using powered means, actuation unit 1540 adjusts vehicle seats 1521-1526 in accordance with vehicle seat adjustment instructions received gesture-controller 1535. Actuation unit 1540 may include actuators electrically connected to motors coupled to vehicle seats 1521-1526. Upon receipt of instructions regarding vehicle adjustments from gesture-controller 1535, actuation unit 1540 encodes and transmits vehicle seat adjustment instructions to the actuators which power the motors. The motors operate to adjust vehicle seats 1521-1526 as appropriate, including to slide seat bottoms 1521b, 1522b, 1523b, 1524b, 1525b, and 1526b forward or backward longitudinally and to rotate seat backs 1521a, 1522a, 1523a, 1524a, 1525a, and 1526a.

Actuation unit 1540 may also operate through manual means facilitated by selectively releasable locking mechanisms. In such exemplary implementations, gesture-controller 1535 transmits vehicle adjustments to actuation unit 1540, but actuation unit 1540 does not automatically adjust vehicle seats 1521-1526 in accordance with the vehicle adjustments. When users 1514, 1516 arrive at vehicle 1505, users 1514, 1516 manually adjust vehicle seats 1521-1526 to accommodate appropriate vehicle seat adjustments. In such embodiments, actuation unit 1540 may include selectively releasable locking mechanisms powered by respective actuators that can occupy open and locked positions. In open positions, seat backs 1521a, 1522a, 1523a, 1524a, 1525a, 1526a are permitted to recline forward or backward, and seat bottoms 1521b, 1522b, 1523b, 1524b, 1525b, 1526b are permitted to slide longitudinally forward or backward. After users 1514, 1516 adjust vehicle seats 1521-1526 to positions in accordance with the vehicle adjustments computed by gesture-controller 1535, the locking mechanisms engage in a locked position to block further adjustment. Vehicle 1505 may guide users 1514, 1516 regarding how vehicle seats 1521-1526 should be adjusted through a display that provides guidance, based on instructions received from gesture-controller 1535, on how vehicle seats 1521-1526 should be adjusted to achieve the vehicle seat adjustments computed by gesture-controller 1535. Users 1514, 1516 may follow the displayed guidance until the selectively releasable locking mechanisms engage in locked positions.

Actuation unit 1540 may also operate through manual means that do not include selectively releasable locking mechanisms. Where vehicle 1505 operates through manual means, vehicle 1505 may still include a display that provides guidance to users 1514, 1516 on how each of vehicle seats 1521-1526 should be adjusted to align with vehicle seat adjustments computed by gesture-controller 1535. Users 1516, 1518 may follow displayed guidance until vehicle seats 1521-1526 are properly adjusted. Vehicle 1505 may alert users 15014, 15016 in response to vehicle seats 1521-1526 being properly adjusted, such as through a visual notification on the display or through an audio notification.

Additional aspects and alternatives for vehicle seat actuation in accordance with the present disclosure are disclosed in U.S. Pat. App. Ser. No. 61/970,681, filed on Mar. 26, 2014 and entitled VEHICLE SEAT, and in U.S. Pat. App. Ser. No. 61/970,678, filed on Mar. 28, 2014 and entitled VEHICLE SEAT, both of which are hereby incorporated by reference in their entireties.

A second embodiment of a gesture-adjustment system 1612 is shown in FIGS. 20-22C. Gesture-adjustment system 1612 is similar to the gesture-adjustment system 1512 of FIGS. 11A-19, but also includes components that support additional functionality. In particular, gesture-adjustment system 1612 includes passenger detectors 1615 that prevent vehicle seats 1521-1526 from moving when occupied by passengers and resistance detectors 1614 that prevent vehicle seats 1521-1526 from damaging cargo 1616 located in the movement path of vehicle seats 1521-1526. Gesture-adjustment system 1612 also includes vehicle status indicator 1664 and gesture mode selector 1666 for factoring the current status of vehicle 1505 to select vehicle adjustments that are appropriate for the current status of vehicle 1505.

In illustrative embodiments, gesture-adjustment system 1612 disables vehicle seat adjustments for vehicle seats 1521-1526 that are occupied by passengers. This can promote passenger safety and comfort by preventing vehicle seat adjustments from being triggered when passengers are occupying vehicle seats 1521-1526. Gesture-adjustment system 1612 detects passengers using passenger detector 1615, which may detect whether passengers are located in vehicle seats 1521-1526 by obtaining readings from center seat bottom sensor 1530e, discussed in connection with FIG. 17. Although FIG. 10 shows illustrative seat bottom sensor 1530e disposed in vehicle seat 1521, it should be understood that all vehicle seats 1521-1526 may include a seat bottom sensor 1530e that communicates to passenger detector 1615.

Passenger detector 1615 is communicatively coupled with actuation unit 1540, as shown in FIG. 10. In response to detecting that a passenger is occupying one or more vehicle seats 1521-1526, passenger detector 1615 may encode and communicate signals to actuation unit 1540 indicating which vehicle seats 1521-1526 are occupied. In response, actuation unit 1540 may disable actuation of vehicle seats 1521-1526 that are occupied.

In illustrative embodiments, gesture-adjustment system 1612 prevents damage to obstructions located within movement paths of vehicle seats 1521-1526 by detecting the obstructions and stopping actuation of vehicle seats 1521-1526 in response. Where the obstruction is cargo, this can prevent damage to the cargo. Where the obstruction is a vehicle passenger, this can prevent discomfort and injury to the passenger.

Gesture-adjustment system 1612 detects obstructions through resistance detectors 1614, which may detect obstructions by obtaining readings from lower seat back sensor 1530d, discussed in connection with FIG. 7. In the illustrative embodiment of FIG. 10, as vehicle seat 1523 is moved backward longitudinally, cargo 1616 applies pressure on lower seat back sensor 1530d, which transmits readings to resistance detector 1614. In response, resistance detector 1614 determines that an obstruction lies in the movement path of vehicle seat 1523. Although FIG. 10 illustrates operation of resistance detector 1614 with reference to cargo 1616, resistance detector 1614 may operate similarly with respect to feet/legs of a passenger occupying vehicle seat 1525.

Although FIG. 10 shows illustrative lower seat back sensor 1530d disposed in vehicle seat 1523, it should be understood that all vehicle seats 1521-1526 may include lower seat back sensors 1530d that communicate with resistance detector 1614. Moreover, other suitable locations for sensors 1530 may be used, including sensors disposed in seat bottoms 1521b, 1522b, 1523b, 1524b, 1525b, 1526b.

Resistance detector 1614 is communicatively coupled with actuation unit 1540, as shown in FIG. 10. In response to detecting an obstruction along a movement path of vehicle seats 1521-1526, resistance detector 1614 may encode and communicate signals to actuation unit 1540 indicating which vehicle seat 1521-1526 is being obstructed. In response, actuation unit 1540 may disable actuation of the vehicle seats 1521-1526 being obstructed. In illustrative embodiments, actuation unit 40 moves vehicle seats 1521-1526 until such time that obstructions, such as cargo 1616, are secured but not squeezed.

As explained, gesture-adjustment system 1612 includes a vehicle status indicator 1664 for determining a vehicle status and a gesture mode selector 1666 for determining a mode of operation for gesture-controller 1535. Vehicle status indicator 1664 performs vehicle status detection process 1658, shown in FIG. 21. Vehicle status detection process 1668 includes a detecting step 1670 for detecting the status of vehicle passenger doors (not shown) and vehicle hatch door 1507 (shown in FIG. 10), including a detection of whether each of the vehicle passenger doors are open or closed and whether hatch door 1507 is open or closed. Vehicle status detection process 1668 proceeds to detecting step 1672, which detects the speed of vehicle 1505. In illustrative embodiments, vehicle status detection process 1668 detects other aspects of the status of vehicle 1505, including the manner by which vehicle 1505 is operating or the environment of vehicle 1505.

Gesture mode selector 1666 performs gesture mode selection process 1676, also shown in FIG. 21. Gesture mode selection process 1676 begins with determining step 1678, in which gesture mode selector 1666 determines whether vehicle 1505 is moving based on the results of detecting step 1672, performed by vehicle status indicator 1664. In response to a determination that vehicle 1505 is moving, gesture mode selection process 1676 proceeds to operating step 1680, in which gesture-adjustment system 1612 is operated in a transit mode.

In response to a determination that vehicle 1505 is not moving, gesture mode selection process 1676 proceeds to operating step 1682, in which gesture-adjustment system 1612 is operated in either a passenger-entry mode or a cargo-loading mode. To determine which of these modes to use, gesture mode selection process 1676 proceeds to determining step 1688, which determines whether hatch door 1507 is open based on the results of detecting step 1670, performed by vehicle status indicator 1664. In response to a determination that hatch door 1507 is not open, gesture mode selection process 1676 proceeds to operating step 1690, in which gesture-adjustment system 1612 is operated in passenger-entry mode. In response to a determination that hatch door 1507 is open, gesture mode selection process 1676 proceeds to operating step 1692, in which gesture-adjustment system 1612 is operated in cargo-loading mode.

Gesture controller 1535 may associate different types of gestures with different respective vehicle adjustments based on whether gesture-adjustment system 1612 is operated in passenger-entry mode, cargo-loading mode, or transit mode. For example, when operating in passenger-entry mode, gesture-adjustment system 1612 may associate gestures with vehicle adjustments in the manner suggested by FIG. 19. However, when in cargo-loading mode, gesture-adjustment system 1612 may accept gesture-based inputs that are more conducive for users 1514, 1516 that are loading cargo into vehicle 1505.

A cargo-loading mode for gesture-adjustment system 1612 is illustrated in FIGS. 22A-C. Cargo-loading mode may be entered when a cargo hatch 1507 is open or upon activation of a button available on the hatch 1507 or on a key fob. In a cargo-loading mode, gesture-adjustment system 1612 may accept gesture-based inputs via cargo 1702 and may perform vehicle adjustments that are tailored to facilitate cargo loading. Thus, in a method of operation in accordance with a cargo-loading mode, user 1514 inserts cargo 1702 into hatch 1506. In the depicted configuration, seat backs 1525a, 1526a of third-row vehicle seats 1525, 1526 have already been pivoted down such that third-row vehicle seats 1525, 1526 assume full-folded positions. Cargo 1702 abuts against rear surface 1523c of seat back 1523a of second-row vehicle seat 1523 and applies pressure to seat back 1523a. In response, second-row vehicle seat 1523 is moved forward longitudinally toward first-row vehicle seat 1521, as suggested in FIG. 22A. This forward longitudinally movement of second-row vehicle seat 1523 allows cargo 1702 to be inserted into hatch 1506 of vehicle 1505.

If cargo 1702 requires still further space in order to fit within vehicle 1505, user 1514 may use cargo 1702 to apply continued pressure to rear surface 1523c. Vehicle seat 1523 will ultimately reach a full-forward position. In response to still continued pressure applied by cargo 1702 to rear surface 1523c, seat back 1523a of vehicle seat 1523 may pivot down towards seat bottom 1523b to a full-fold position, as suggested in FIGS. 22B-C. If there is insufficient longitudinal clearance for seat back 1523a to pivot down towards seat bottom 1523b (e.g., if head rest of vehicle seat 1523 is blocked by seat back 1521a of vehicle seat 1521), gesture-adjustment system 1612 may move vehicle seat 1523 longitudinally backward to provide the necessary clearance to allow seat back 1523a to pivot down to a full-fold position. Thus, vehicle seat 1523 is arranged within vehicle 1505 to allow cargo 1702 to be stowed on top vehicle seat 1523 as suggested in FIG. 22C.

As shown, when operating in cargo-loading mode, gesture-adjustment system 1612 may perform different types of vehicle adjustments in response to different types of gesture-based inputs than in passenger-entry mode. In the illustrative example discussed above, gesture-adjustment system 1612 moves vehicle seats 1521-1526 forward longitudinally to full-forward positions in response to continued pressure applied to rear surfaces 1521*c*, 1522*c*, 1523*c*, 1524*c*, 1525*c*, 1526*c*, and then pivots seat backs 1521*a*, 1522*a*, 1523*a*, 1524*a*, 1525*a*, 1526*a* down to full-fold positions in response to continued pressure. The double-tap gesture 1574 and double-swipe gesture 1630, shown in FIGS. 13B and 15A respectively, result in similar vehicle adjustments during passenger-entry mode but would be inconvenient for cargo-loading purposes because it may be difficult to perform tapping or swiping gestures while handling bulky cargo. Thus, double-tap gesture 1574 and double-swipe gesture 1630 may be enabled during passenger-entry mode, but not during cargo-loading mode.

Likewise, gesture-adjustment system 1612 may perform different types of vehicle adjustments in response to different types of gesture-based inputs when vehicle 1505 is in transit mode. During transit mode, gesture-based inputs may correspond to vehicle adjustments that promote passenger comfort rather than entry of passengers or loading of cargo. For example, users 1514, 1516 may occupy one of vehicle seats 1521-1526 and apply gestures to their vehicle seat 1521-1526 to move the vehicle seat 1521-1526 forward or backward longitudinally and/or to pivot seat back 1521*a*, 1522*a*, 1523*a*, 1524*a*, 1525*a*, 1526*a* to achieve a more comfortable position and orientation.

In illustrative embodiments, gesture-based inputs can be applied using other body parts of users 1514, 1516 other than fingers or hands. For example, users 1514, 1516 may lean their upper bodies backward as to apply pressure against seat back 1521*a*, 1522*a*, 1523*a*, 1524*a*, 1525*a*, 1526*a*, which may result in their vehicle seat 1521-1526 moving backward longitudinally. Similarly, users 1514, 1516 may lean their bodies forward as to reduce pressure applied against their seat back 1521*a*, 1522*a*, 1523*a*, 1524*a*, 1525*a*, 1526*a* and increase pressure applied to a front portion of their seat bottom 1521*b*, 1522*b*, 1523*b*, 1524*b*, 1525*b*, 1526*b*, which may result in their vehicle seat 1521-1526 moving forward longitudinally. By having a variety of locations for sensors 1530*a-e*, shown in FIG. 17, gesture-adjustment system 1612 is capable of receiving a variety of gesture-based inputs.

Although vehicle adjustments described above included longitudinal movement of vehicle seats 1521-1526 and pivoting of seat backs 1521*a*, 1522*a*, 1523*a*, 1524*a*, 1525*a*, 1526*a*, illustrative embodiments may include other types of vehicle seat adjustments, including vertical height of vehicle seats 1521-1526 and rotational tilt of seat bottoms 1521*b*, 1522*b*, 1523*b*, 1524*b*, 1525*b*, 1526*b*. Still other vehicle seat adjustments may include longitudinal length or lateral width of seat cushions that are part of seat bottoms 1521*b*, 1522*b*, 1523*b*, 1524*b*, 1525*b*, 1526*b*, vertical height or lateral width of seat cushions that are part of seat backs 1521*a*, 1522*a*, 1523*a*, 1524*a*, 1525*a*, 1526*a*, bolster adjustment of vehicle seats 1521-1526, upper back adjustment of seat backs 1521*a*, 1522*a*, 1523*a*, 1524*a*, 1525*a*, 1526*a*, lumbar adjustment of seat backs 1521*a*, 1522*a*, 1523*a*, 1524*a*, 1525*a*, 1526*a*, and adjustment of headrests of vehicle seats 1521-1526.

Likewise, vehicle adjustments may include adjustments to vehicle equipment in addition to vehicle seats 1521-1526. For example, in response to gesture-based inputs, gesture-adjustment system 1612 may adjust the position and/or orientation of a steering wheel, rearview mirrors, side mirrors, and other vehicle equipment. In illustrative embodiments, when users 1514, 1516 sitting in vehicle seats 1521-1526 stretch against seat backs 1521*a*, 1522*a*, 1523*a*, 1524*a*, 1525*a*, 1526*a*, massaging or heating functionality of vehicle seats 1521-1526 may turn on.

Additional aspects and alternatives in accordance with the present disclosure are disclosed in U.S. Pat. App. Ser. No. 61/970,681, filed on Mar. 26, 2014 and entitled VEHICLE SEAT, and in U.S. Pat. App. Ser. No. 61/970,678, filed on Mar. 28, 2014 and entitled VEHICLE SEAT, both of which are hereby incorporated by reference in their entireties.

The components described above, including gesture-controller 1535, actuation unit 1540, vehicle status indicator 1664, gesture mode selector 1666, and resistance detector 1614, may be implemented in software and compiled and stored to a memory as object code. During runtime, the software may be invoked for execution by a processor. In one implementation, gesture-adjustment systems 1512, 1612 are implemented as single systems on a chip. The above-described components may communicate with other components in vehicle 1505 through any suitable electronic communication mechanism, such as a communication bus or cabling. In other implementations, gesture-adjustment systems 1512, 1612 may be implemented on separate hardware modules placed in communication with one another through any suitable electronic communication mechanism, such as a communication bus or cabling. Communication may also be provided through wireless networks, such as 802.11 (WiFi), NFC, BlueTooth®, or other suitable technologies. Data regarding default gestures 1622, user configurable gestures 1624, and corresponding vehicle adjustments may be stored to memory modules. Database 1559 and look-up table 1620 may be implemented using any suitable database environment, such as Oracle, DB2, or SQL Server.

While the disclosure herein is specifically directed toward a second-row vehicle seat, the teaching herein may be equally applicable to vehicle seats arranged in any row of a passenger vehicle. Also, while the vehicle seats of the present disclosure are arranged in an automotive vehicle environment, the teaching herein may be equally applicable vehicle seats in other environments (e.g. boats, airplanes, trains, amusement rides, etc.). Further, such seats may also be used outside of vehicle environments (e.g. movie theaters, stadiums, etc.) without departing from the scope of this disclosure.

The invention claimed is:

1. A vehicle seat comprising
a seat bottom adapted to be bracketed to a floor to slide along the floor,
a seat back coupled to the seat bottom, and
a seat motion system including a slide mover configured to move the seat bottom relative to the floor, a sensor unit, and a controller coupled to the slide mover and to the sensor unit, the controller configured to activate the slide mover in response to inputs received from the sensor unit, and the seat motion system configured to drive movement of the seat bottom relative to the floor in a direction of movement in response to a user applying a force in the direction of movement onto the seat back or onto the seat bottom.

2. The vehicle seat of claim 1, wherein the controller is configured to receive signals indicative of forces applied to front and back sides of the seat back from the sensor unit and is configured to activate the slide mover in response.

3. The vehicle seat of claim 1, wherein the controller is configured to receive signals indicative of forces applied to the seat bottom and indicative of a passenger seated in the vehicle seat and is further configured to activate the slide mover in response.

4. The vehicle seat of claim 3, wherein the controller is configured to receive a signal associated with non-engagement of a vehicle drive and the controller is further configured to activate the slide mover in response to receipt of signals indicative of forces applied to the seat bottom only after receipt of the signal associated with non-engagement of a vehicle drive.

5. The vehicle seat of claim 1, wherein the controller is configured to receive signals indicative of forces applied to front and back sides of the seat back from the sensor unit, the controller is configured to receive signals indicative of forces applied to the seat bottom, and is configured to activate the slide mover in response to the signals received.

6. The vehicle seat of claim 5, wherein the controller is configured to multiply the signals by different coefficients to apply gain to the signals, the coefficients depending on (i) whether the vehicle seat is pushed forward or pulled backward, (ii) whether the force signals are associated with a force applied to the seat bottom or the seat back, or (iii) the location of the vehicle seat relative to the floor and the controller is configured to operate the slide mover based on the signals after gain is applied.

7. The vehicle seat of claim 4, wherein the powered means for moving the vehicle seat includes an enablement unit coupled to the controller, the controller is configured to receive a user input associated with release of the vehicle seat to slide along the floor from the enablement unit, and the controller is further configured to activate the slide mover in response to receipt of signals indicative of forces applied to the seat bottom only after receipt of the user input associated with release of the vehicle seat.

8. The vehicle seat of claim 7, wherein the seat bottom and the seat back are free of electronic user input buttons, switches, and levers associated with movement of the seat bottom along the floor.

9. An in-vehicle system for adjusting a vehicle seat in response to a gesture applied by a user to the vehicle seat, the in-vehicle seat comprising
  a sensor configured to detect pressure applied by the user to the vehicle seat and to generate a signal reflecting the pressure applied by the user to the vehicle seat,
  means for determining a gesture intended by the user based on characteristics of the generated signal and for mapping the gesture to a corresponding vehicle seat adjustment,
  wherein a single-tap gesture applied to a rear surface of the vehicle seat corresponds to a vehicle seat adjustment that moves the vehicle seat longitudinally forward by a fixed distance,
  a single-tap gesture applied to a front surface of the vehicle seat corresponds to a vehicle seat adjustment that moves the vehicle seat longitudinally backward by a fixed distance,
  a double-tap gesture applied to a rear surface of the vehicle seat corresponds to a vehicle seat adjustment that moves the vehicle seat to a full-forward longitudinal position, and
  a double-tap gesture applied to a front surface of the vehicle seat corresponds to a vehicle seat adjustment that moves the vehicle seat to a full-back longitudinal position, and
  an actuation unit configured to adjust the vehicle seat in accordance with the vehicle seat adjustment.

10. The in-vehicle system of claim 9, further comprising
  a detector coupled to the actuation unit to detect an obstruction located within a movement path of the vehicle seat,
  wherein the actuation unit is configured to stop actuation of the vehicle seat in response to detecting of the obstruction.

11. The in-vehicle system of claim 9, further comprising
  a detector coupled to the actuation unit for detecting a passenger occupying the vehicle seat and
  wherein the actuation unit is configured to stop actuation of the vehicle seat in response to a detection of the passenger.

12. A method for adjusting a vehicle seat in response to a gesture applied by a user, the method comprising the steps of
  accepting a gesture-based input from a user on any surface proximal to a sensor disposed within the vehicle seat, the sensor configured to receive gesture-based inputs for adjusting a seat bottom and a seat back included in the vehicle seat,
  processing a signal reflecting the gesture-based input,
  identifying characteristics of the signal that distinguish the gesture-based input applied by the user from other gesture-based inputs,
  determining a gesture intended by the user based on the identified characteristics,
  mapping the gesture to a corresponding vehicle seat adjustment, and
  adjusting at least one of the seat bottom and the seat back included in the vehicle seat in accordance with the vehicle seat adjustment.

13. The method of claim 12, wherein the accepting step comprises the step of accepting user-applied pressure proximal to the sensor disposed within the vehicle seat.

14. The method of claim 13, wherein the accepting step further comprises the step of accepting at least one of a single-tap, a double-tap, and a press-and-hold gesture.

15. A method for adjusting a vehicle seat in response to a gesture applied by a user, the method comprising the steps of
  accepting a gesture-based input from a user,
  processing a signal reflecting the gesture-based input,
  identifying characteristics of the signal that distinguish the gesture-based input applied by the user from other gesture-based inputs,
  determining a gesture intended by the user based on the identified characteristics,
  mapping the gesture to a corresponding vehicle seat adjustment, and
  adjusting the vehicle seat in accordance with the vehicle seat adjustment,
  wherein the accepting step comprises the step of accepting user-applied pressure proximal to sensors disposed within the vehicle seat,
  wherein the accepting step further comprises the step of accepting at least one of a single-tap, a double-tap, and a press-and-hold gesture,
  wherein the mapping step comprises the steps of
  mapping a single-tap applied to a rear surface of the vehicle seat to a vehicle seat adjustment that moves the vehicle seat longitudinally forward by a fixed distance,
  mapping a single-tap gesture applied to a front surface of the vehicle seat to a vehicle seat adjustment that moves the vehicle seat longitudinally backward by a fixed distance,
  mapping a double-tap gesture applied to a rear surface of the vehicle seat to a vehicle seat adjustment that moves the vehicle seat to a full-forward longitudinal position, and mapping a double-tap gesture applied to a front surface of the vehicle seat to a vehicle seat adjustment that moves the vehicle seat to a full-back longitudinal position.

16. The method of claim 12, wherein the accepting step comprises the step of accepting user-drawn gestures on a touch-sensitive surface disposed on the vehicle seat.

17. The method of claim 16, further comprising the step of mapping the user-drawn gesture to a vehicle seat adjustment that moves multiple vehicle seats.

18. The method of claim 12, wherein the identifying step includes the step of identifying at least one of a number of load spikes in the signal, heights of load spikes in the signal, and widths of load spikes in the signal.

19. The method of claim 12, wherein the adjusting step comprises the steps of
   adjusting a longitudinal position of the seat bottom of the vehicle seat and
   adjusting a rotational position of the seat back of the vehicle seat.

20. The method of claim 12, further comprising the steps of
   detecting an obstruction located in a movement path of the vehicle seat and
   stopping actuation of the vehicle seat in response to detecting the obstruction.

21. The method of claim 12, further comprising the steps of
   detecting a passenger occupying the vehicle seat and
   stopping actuation of the vehicle seat in response to detecting the passenger.

22. The method of claim 12, further comprising the step of mapping the intended gesture to a predetermined arrangement of all vehicle seats of a vehicle.

23. The method of claim 22, further comprising the step of enabling the user to program into a computer-readable memory a sequence of gesture types to correspond with the predetermined arrangement.

24. The method of claim 12, further comprising the steps of
   detecting a vehicle status
   selecting a mode of operation based on the vehicle status and
   determining which vehicle seat adjustment corresponds to the determined gesture based on the mode of operation.

25. The method of claim 24, wherein the selecting step includes the step of selecting at least one of a transit mode, a cargo loading mode, and a passenger entry mode.

26. The vehicle seat of claim 1, wherein the seat motion system is configured to drive movement of the seat bottom relative to the floor in a forward direction in response to the user applying the force onto the seat back or the seat bottom in the forward direction and the seat motion system is configured to drive movement of the seat bottom relative to the floor in a rearward direction in response to the user applying the force onto the seat back or the seat bottom in the rearward direction.

* * * * *